(12) United States Patent
Weber

(10) Patent No.: US 6,522,309 B1
(45) Date of Patent: Feb. 18, 2003

(54) MULTISCREEN PERSONAL COMPUTER DISPLAY METHOD AND APPARATUS

(75) Inventor: Harold J. Weber, Centerville, MA (US)

(73) Assignee: Savry Stuff Property Trust, Centerville, MA (US)

( * ) Notice: Subject to any disclaimer, the term of this patent is extended or adjusted under 35 U.S.C. 154(b) by 0 days.

(21) Appl. No.: 09/515,081

(22) Filed: Feb. 28, 2000

(51) Int. Cl.$^7$ ................................................. G09G 5/00
(52) U.S. Cl. ......................................... 345/1.1; 345/2.1
(58) Field of Search .......................... 345/1.1, 1.2, 1.3, 345/2.1, 2.2, 2.3, 3.1, 3.2, 3.3, 3.4

(56) References Cited

U.S. PATENT DOCUMENTS

| | | | | |
|---|---|---|---|---|
| 5,373,307 A | * | 12/1994 | Shirashi | 345/2.2 |
| 5,469,183 A | * | 11/1995 | Takatsuji et al. | 345/2.2 |
| 5,726,669 A | * | 3/1998 | Obata et al. | 345/2.2 |
| 5,818,425 A | * | 10/1998 | Want et al. | 345/2.2 |
| 5,953,074 A | * | 9/1999 | Reddy | 345/3.1 |

* cited by examiner

*Primary Examiner*—Xiao Wu

(57) ABSTRACT

A computer providing multiple display capability where one display presents the current document and another display may show a true display of a previously opened document. The computer is a singular processed video data signal source which presents a primary monitor with current video data. A user selected video screen sample of the current processed video data signal is diverted to this invention where it is stored in a memory. Subsequently the stored video screen sample of the processed video data signal is read-out of the memory and reconstituted as an absolute copy of the original processed video data signal and concurrently presented on a secondary monitor. User selection may be attained by a keyboard key-sequence entry, a mouse button click or using an external button-switch. Operation is absolutely independent from operating system constraints, being of equivalent usefulness while running any Operating System versions of Windows®, Unix, MS-DOS, Linux, CP/M86 or Apple-OS. The device is preferably configured as a standalone peripheral, having two video ports connected essentially between the computer's "video output" port and the primary monitor's "video input" port and a third video port coupled with the secondary monitor's "video input" port.

20 Claims, 14 Drawing Sheets

| BANK 0 | W1 | R2 | R2 | W4 | R2 | R2 | W7 | R2 | R2 | W10 | R2 | R2 |
|---|---|---|---|---|---|---|---|---|---|---|---|---|
| BANK 1 | X | W2 | R1 | R2 | W5 | R1 | R2 | W8 | R1 | R2 | W11 | R1 |
| BANK 2 | X | X | W3 | R1 | R2 | W6 | R1 | R2 | W9 | R1 | R2 | W12 |

TIME →

FIG. 8B

| BANK 0 | W1 | R1 | R2 | W4 | R2 | R1 | W7 | R1 | R2 | W10 | R2 | R2 |
|---|---|---|---|---|---|---|---|---|---|---|---|---|
| BANK 1 | X | W2 | R2 | R1 | W5 | R1 | R2 | W8 | R2 | R2 | W11 | R1 |
| BANK 2 | X | X | W3 | R1 | R2 | W6 | R2 | R1 | W9 | R1 | R1 | W12 |

TIME →

MULTISCREEN PERSONAL COMPUTER DISPLAY METHOD AND APPARATUS

OVERVIEW

A computer user working with an application program that produces one or more screens of information may enter a selection of an immediate screen. The processed video data signal delivered by the computer to the primary monitor that relates to the selected screen is concurrently written into a memory. The application program may next-advance to display another screen, or another application program. Meanwhile the previously selected screen of processed video signal data is stored in a digital memory and continues to be read-out from the memory and reconstituted as a replication of the processed video data signal selected by the user. This replicated signal is subsequently presented to a secondary monitor for viewing as a predecessory document.

The user may then move ahead to view or edit subsequent portions of the same document or a different document on the primary video monitor. In addition, different software originated windows of information are maximizable and separately displayable on each the primary and secondary video monitors. The device performance stands absolutely independent from operating system constraints. It has been found to be equally valuable for use with programs running under Windows®, MS-DOS, Unix, Linux, CP/M86, OS/2, Apple-OS, Macintosh® and other operating systems where a processed video signal either in graphical or ASCII format is coupled between the computer and a monitor. A current screen data signal is also obtainable through the computer's parallel LPT ports or serial COM ports. A SHIFT+PRINT_SCREEN keyboard command is ordinarily submitted through keyboard entry to initiate an export of pertinent video data by way of the computer's printer port. This video data is stored in memory and readout on the secondary video monitor. A primary display video screen selection is made by actuation of an auxiliary key-switch associated with the adapter, by a "third" mouse button entry or by a unique keyboard sequence entry processed by a TSR program to enable the necessary function. Expansion to several secondary video monitors is obtainable through usage of additional memory and control circuitry whereby several preceding document pages or windows of information are simultaneously displayed, enabling more efficient editing or comparison between disparate document portions.

BACKGROUND OF MY INVENTION

Computers are much used in offices and other business settings, as well as for personal use, in preparing documents, writing letters, completing forms and searching data. Computers also find substantial application in desktop publishing of newsletters, brochures and advertising literature. In each of these cited usages, it is often desirable if not absolutely necessary to reference against another document page, or even another class of document. In the earlier text-based computers running MS-DOS, UNIX, etc. it was common practice to "print out" a hard copy of the reference page. This approach was superceded by Windows® software that allowed the layering of two or more related pages. None of these earlier approaches gave a truly concurrent view of a "before" and "current" document. Real time concurrency between two disparate screens has not been practicable, at least not until now.

Windowing OS Application

Common practice in contemporaneous computers is to utilize windowing-capable Operating System "OS" software. Windowing type Graphical User Interfaces "GUI", initially developed by Xerox Corporation and first appearing commercially on early Apple Macintosh® computers provides a user with a near-concurrent view of two or more screens of data/derived from one or more separately running programs. Subsequently the windowing GUI was further developed and more importantly, popularized as a defacto standard of the personal computer industry by Microsoft Corporation. Recognize that Microsoft Windows® appears in one version or another in a vast majority of the worlds desktop, personal and portable computers. A current trend is a rapid increase in the installation of a Linux OS, an open architecture freeware version of Unix, in commercial network and workgroup systems. This suggests that Linux (and Unix) may command a substantial portion of the client workstation applications in the near future. Linux provides a GUI having most of the GUI features of other competitive windowing format OS software. A most popular Linux GUI is "X Window Systems", a freeware program available from Red Hat Software Inc. and others. In addition Corel Corporation supplies "WordPerfect-8" for Linux, which extends the potential for Linux applicability to many more critical usages, such as intranet applications within law firms and the like. A primary advantage afforded by Linux in such critical applications, for example, is the "crash resistance" Linux (or Unix) affords over a typical Microsoft Windows Operating System, while maintaining a goodly degree of compatibility between Microsoft Windows based files and Linux. In contrast, negligible compatibility exists between an Apple OS based applications file and either Microsoft Windows or Linux. Further Linux information may be determined at the Linux website: www. linux.org and the Corel Corporation's website: *www.linux.corel.com*.

Word processors, spread sheet programs, data base programs and other applications oriented software programs frequently include various windows of related data information which is brought up to full screen size for viewing. These windows are used like a reference, usually viewed in a passive state. That is to say, they are not necessarily subject to immediate editing efforts.

In concurrent application operation, where two or more file editor programs (e.g., word processor, data base, spreadsheet, etc.) are running at the same time, disparate displays are produced which may indirectly relate to one-another via dissemination to the computer's user through a video display and subsequent keyboard entry into an instant program data stream by the user. Letters or other documents stored in more than one word processor or database file are frequently needed to tie together a user's thought process.

Multiple Window Displays

Popular windowing graphical user interface GUI "operating system" software, such as Microsoft Windows® 3.11, Windows98®, Windows2000®, Unix and Linux (and lesser used Apple-Macintosh, iMac® and IBM-OS/2 software), is known to do a heretofore acceptable job of enabling cross-document examination by enabling a user to open one or more additional document windows. This prior art approach is fraught with a major shortfall manifesting itself as an practicable difficulty in providing a user with a quick ease of readability. This objectionable usability factor arises due to a fragmented screen appearance introduced by subwindow layers and an implicit and distracting need for switching back and forth between one or more subwindows typically introduced by the necessitous window partitions situate on the main display screen. As a practical result, the user is frequently "jumping back and forth" between the top window and one or more individual under-layers of subwindows, with an attendant distraction from the central work effort of editing or assembling a principal document's text and associated train of thought.

Microsoft Word® or Corel WordPerfect® running rounder an appropriate version of Microsoft's Windows®, (viz, Windows-3.1,-3.11,-95,-98,-2000,-NT, etc.) as well as Corel WordPerfect® running under a version of Linux (such as Red Hat Linux 5.2) typify this class of wordprocessor editors. An inevitable result of awkward multi-window editing which routinely occurs while using these (and similar) types of programs frequently drives the user to make a print-out of a temporary hard-copy support document. This obvious expedient, while wasteful of time and paper, is also less efficient to use than what an eye-level "on screen" presentation of an immediate predecessory document could provide. The intermediate hardcopy is sometimes produced through expedient use of the SHIFT+PRINT_SCREEN keyboard command now provided on most IBM-type personal computer systems, or through the use of a program's "print" command typically by limiting the printout to the page of immediate interest.

It is in this sort of "comparative" application, where it may be desirable if not necessitous to view a supplementary document while typing-in or editing a primary document, that a "multiple viewing screen" provision may introduce a new level of convenience and operating efficiency into a user's everyday workload. In a practical sense, this translates into a better budget of time, speedier editing actions and general cost savings for any business where the user is an employee.

Windows98 Multiple Monitor Display

Microsoft Windows98® provides the software support necessary to use up to nine monitors. The monitors may be set up like a big desktop, or a different program might run on each monitor. This may enable the use of a wordprocessor on one monitor, a spreadsheet on another and a data base program on yet another monitor. A principal drawback to this approach for multiple monitor operation is that the user must have installed a separate PCI graphics adapter for each monitor. Furthermore, the multiple monitor feature of Windows98® only supports PCI graphics adapters in which the input data signals are raw (unprocessed) video data signals derived from the computer's PCI bus.

The obvious shortfall of this Windows98® based multiple monitor system is inherent in the incapacity for the approach to be used universally with multiple monitors deriving their video signals from other operating systems such as Linux, MS-DOS, Mac-OS, etc. Additionally, this approach works seamlessly only with applications programs that have provisions for the multiple monitor mode, which negates its applicability to a widespread base of pre-existing programs. Nor will this approach work with proprietary operating systems frequently used with commercial applications, such as found in banks and similar non-Microsoft dependent computer systems.

The user will immediately recognize a superiority of this invention's teachings over that of the prior art advanced by Windows98® is the ability to work with virtually any computer and monitor combination, irrespective of the operating system and application program combinations.

Non-Window Operating Systems Displays

Many "professional" software programs used for data management and similar serious business purposes are written in a native language code, i.e. in something like Cobol, Pascal, Fortran, "C", "C++" or any of several other programming languages. Typically, these sort of programs run directly under non-windowing bare-bones operating systems such as Microsoft's MS-DOS®, Digital Research's CP/M86, UNIX and LINUX. As is well known, use of these more basic operating systems when run with a well written Assembly language source code or a compiled language such as "C" can lead to far faster and functionally more efficient operational performance with significantly less susceptibility to "crashes" and other annoying malfunctions typical of Windows® dependant programs.

The sheer size of the Windows® operating system files (e.g., several hundred megabytes) and considerable graphical interface oriented data processing makes a more basic operating system preferable when functional speed and operational reliability are of paramount essence. In comparison with the enormous file size requirements, a decent non-windows operating system such as MS-DOS can ordinarily be contained in files of merely a few megabytes in size.

Some custom programs are written with pseudo-windows action (e.g., windows-like functionality not derived from an underlying Windows® or Macintosh operating system). This has been a long known software artform, used in the earliest IBM-PC type computers having basic monochrome graphics capability, such as provided by the then-popular Hercules graphics video adapter.

Notwithstanding these custom programs, it is well known that most non-Windows® oriented programs have little or no windows-like capability, or ability to display more than an immediate screen of information on a monitor. Concurrent operation of disparate programs to provide near simultaneous monitor display is even more exceptional and ordinarily not applicable to conventional non-windows applications programs.

Providing Concurrent Multiscreen Display

My invention now overcomes this deficiency, allowing the concurrent display of an immediate screen of information on the primary monitor and a predecessory screen of information on a secondary monitor, all without benefit of a dependence upon a Windows® or Macintosh® operating system's support. In its most basic operating form, assume you want to view the content of a data file while you type a letter on a word processor. Using this invention, you first open the data file and present it on the primary monitor. When you are satisfied with the screen appearance (e.g., the information you seek is visible), you grab the video signal and store it for readout and replicate display on the secondary monitor. In effect the display becomes "locked onto" the secondary monitor. Next, the word processor is loaded and you view your work document or letter on the primary monitor while you may review data held on the secondary monitor's screen.

Unambiguous Predecessory Display

In reiteration, I realized that a far superior method for providing a computer user with serviceable interactive cross-file editing is attained if the predecessory reference or support document data display is supplied near eye-level as an unambiguous presentation on the secondary video monitor. Meanwhile the primary monitor is used solely for display of the main, or working, document data.

Sneaker Networking

In a primitive form, this dual document display arrangement is sometimes clumsily implemented through a "sneaker network" approach, wherein the immediate data file is manually transferred from "computer A" and carried over to "computer B" by using a floppy-disk, ZIP-Disk®, or the like which is used to temporarily hold data and allow an operator to manually transfer the data into a separate computer system where it might be separately displayed adjacent with the primary display as predecessory data. This is a long-used approach and its limitations and convenience shortfalls are well known, not the least of which is the requirement for a wholly separate and necessarily similar second computer system which is loaded with and running (a separate copy of) a similar application software program in order to effect a generally useful presentation of the reference document data file. In this prior art arrangement, the main computer is used for a principle editing or data entry function, while the second computer serves merely to display contents of the reference document.

Local Area Workgroup Networking

In another setup, the data being displayed on the main computer might be networked or ported to the second computer for supplementary display. In a configuration emulating my invention, this setup is treated like a "one-person workgroup". In other words, the same operator is using two or more computers in the same network, viewing the "previous" and "present" data on separate monitor screens. Networking data does require special and costly network adapter hardware and suitable network software support, which necessitates more advanced user skills. For example, each computer in such a peer network (even if used on the same desk by the same person) must be equipped with an EtherNet LAN 10Base-2, 10Base-T or IEEE 802.3 compliant adapter card, i.e., a Boca Research Inc. "BOCALAN-card" or equivalent, and suitable operating software, such as Microsoft Windows for Workgroups, Windows-NT, Windows-98, UNIX, Linux, Novell NetWare and other NDIS and ODI compliant systems. If the network ported data is stored in the slave computer, then predecessory readout may be simulated whereby the display on the master computer may advance ahead of the slave computer. Herewithin, predecessory refers to a historical store or supplementary display of video data which are succeeded or replaced by a subsequent updated or alternate main display. While either of these arrangements can be effective, they each involve substantial hardware duplicity and inherent expense in form of a functionally similar but fully separate computer system hardware, software and related maintenance. Furthermore, a time-consuming necessity for loading or networking a database or program copy containing the reference document data into the second computer system demands time consuming operator training and additional user effort and experience level.

Simple User Interface

These prior approaches obviously do not imitate the essential eloquence of my translative video adaptor (hereinafter TVA or "the adaptor") invention. In these inferior heretofore configurations a considerable interactive manipulation of both computers is necessary to merely emulate the antecedent or predecessory display of an previously viewed screen of data on the slave computer's monitor.

As a result of these shortcomings of the prior art, my TVA stands alone as unique and not merely an obvious extension of the cumbersome and inefficient prior art that heretofore merely utilizes one variation or another of local area networking.

To be truly useful and efficient, the user ought to be able to display a predecessory, reference document with a minimum of time consuming effort, prior skill and requiring a minimal amount of "learning curve" effort in order to get meaningful results. The predecessory display ought to be presentable on a second monitor in a manner which is functionally transparent and operationally unpresumptuous to the average user. In other words, aside from a simple keystroke command or "click" entry via a control device such as a mouse button, the user effort needed for updating of screen data on the second monitor ought to occur without distracting the user from a thought train that may better be focused on the principal document task.

TVA Supports a Slave Monitor

I find that a more efficient and economical form of cross-document data file referencing is readily to obtainable by using a secondary display monitor which is uniquely coupled as a slave to a stored video signal provided by my TVA invention and sampled directly from the computer system's primary display monitor's fully processed video data stream, as opposed to obtaining the raw video data signal from the computer's internal data bus signals. In other words, the processed video data is preferably fully conditioned and formatted as "monitor video signal input ready".

External TVA Interface

A paramount advantage of my invention over known prior art is the intrinsic capability for it to be engineered in variant forms which works equally well with virtually any operating system and in any computer hardware configuration albeit standard or oddball in arrangement. My invention supports all common video formats through appropriate design of the hardware details, including color VGA, EGA, SVGA, CGA, etc. It works well with either monochrome graphics such as Hercules graphics or strictly ASCII-text based displays. Additionally, it is reasonable to design my invention so that a shared unit may be usable with several different video formats.

A preferred embodiment for my invention is as a standalone accessory device that simply plugs in series with the video cabling. In other words, a short video "jumper" cable may connect between the computer's video output connector (usually a DB9 or DB15 form) and an input to my TVA device. The primary monitor and the secondary monitor then each plug into appropriate mating connectors outputted from my TVA device. A foremost advantage of this preferred embodiment of a standalone TVA device is that it can be provided as an independently functional standalone accessory having a form factor about the size of a large cigarette pack that can be hooked-up using a minimum of skill, usually foregoing the usual need for obtaining costly shop service to "install something", such as an adapter card into one of a PC's available "slots".

TVA Stores Full Video Screen Frame

My TVA typically includes sufficient video memory space to ordinarily store at least one full screen of monitor-ready processed video data which are used to produce a separate and usually antecedent video data stream for writing a predecessory image screen on the second display monitor. I also find that grabbing a screen (or frame) of video information is conveniently accomplished through an expedient of providing the user with a separate control button (maybe a third "mouse" button) which is manually actuated to initiate the immediate grabbing of the video frame representing the screenful of video data of interest.

Software Operated Predecessory Image Transfer

I also find that the initiation of a frame-grab event may be convenient when it is software implementable, particularly when the TVA is an external device. The frame grab may initiate through a response by a TSR routine singularly responsive to a unique keystroke combination that initiates a "grab signal" output through the computer's serial port. In practice the TVA is serially coupled with the primary monitor's processed video line and provides a replicate processed video signal to a secondary monitor. Additionally, the TVA is coupled with the RS232C serial output port (usually COM1 or COM2 or equivalent) or a Universal Serial Bus USB port. The grab signal is thus delivered through the serial port and initiates the screen data storage command for the TVA memory to provide predecessory video data for the secondary monitor.

Internal TVA Functions Like "External" TVA

The TVA may be configured so as to allow it to be internally installed as a plug-in circuit card in one of the computer's expansion bus slots. An internally installed TVA is distinctly different in conceptual approach from merely being equivalent to and performing like a second video card, as suggested in the past by Microsoft and others. This distinction is implicit in that the TVA essentially taps-into and accepts a sample of display-ready processed video which ordinarily routes from the computer's usual video processor circuitry directly to the primary video monitor for immediate presentation. In other words, in the usual computer configuration the video tap is made external to the computer hardware, usually via a cable jumper between the TVA and the usual video processor card's output connector.

In this arrangement of my invention, the primary monitor and the secondary monitor each plug-into separate connectors usually sited on the TVA card's mounting plate. In this arrangement, a control signal might be obtained directly from the internal card bus as submitted by the TSR software routine. Alternatively, an external "grab switch" may be connected with the TVA card to permit absolute user controlled manual screen data grab initiation.

A most fundamental intent for my TVA is to avoid a variety of predecessory display errors which a plurality of separate "video adapter" cards operating from raw bus signals may introduce.

Real-Time Processed Video is Utilized

It is urgent to realize and bears repeating that my invention, whether internally mounted as a plugin card or externally located, strictly samples the real-time, processed and monitor-ready video data signal ordinarily delivered from the output of the video adapter card. My TVA stores a true "what you see" frame sample for subsequent "what you get" display on a secondary monitor as an accurate replica of a predecessory image that has been recently displayed on the primary monitor. In other words, the INPUT to my TVA device is derived directly from the OUTPUT of the computer's usual video adapter card as monitor-ready processed video signals.

The physical interface is most often embodied as a short jumper cord extending between the video output and my TVA input. As a result of this operational distinction unique to my invention my TVA must not be misinterpreted as merely "just another form of video card".

With the internally located TVA a transient-stay-resident (henceforward TSR) subroutine program may conveniently serve to implement video frame grabbing in unique response to certain predeterminable patterns of keystroke sequence entries, such as ALT+SHIFT+PRINT_SCREEN, for example. Although a TSR triggered instruction obtained from the computer's control bus is utilized to trigger my invention into action it remains to be absolutely understood that it is the post-processed video signal which is grabbed, sampled and temporarily stored. By definition my invention obtains this post-processed video signal ordinarily from the output of the computer's usual "video card". In contemporaneous computers, this video signal is ordinarily in VGA, SVGA or EGA format or an equivalent technical variation or operational extension and including monochrome graphics or ASCII character based displays.

Separate Computers Compound Video Errors

Additional discrepancies wrought by the prior art methodologies using separate computers may occur as a result of even minor system set-up differences, or due to fundamental variations in image processing technique, particularly between video cards of different brands and models, or of even the same brand picked from different production lots where the video processing algorithm may be-slightly changed.

Emulate Hardcopy Printout as Display

Instead of obtaining the video data signal from the video signal port as the predecessory screen signal, the TVA may alternatively couple with the computer's PARALLEL printer port LPT1 or SERIAL RS-232C port COM1, or a Universal Serial Bus USB connection. In this usage, a SHIFT+PRINT_SCREEN keyboard instruction urges a current screen data stream to be processed so as to flow forth to the parallel (or serial) port. As with tapping into the video adapter's output, this provides an equivalent screen of data which is subsequently stored in an ancillary video memory portion of the TVA. In a "graphics mode" a printer signal delivered in this hookup is quite similar to the primary monitor's video signal and for practical purposes may be considered equivalent. In a standard ASCII screen presentation (e.g. a typical 80 column,1 24 or 25 row alphanumerical screen of data) the characters flow forth from the printer port and may be subsequently stored in my TVA's memory.

The printer port data stored in the TVA memory is subsequently read out and reconstituted in a video format suitable for scanning the monitor screen display. The major difference in this approach is that a "WYSWYG" graphics or ASCII alphanumerical printer signal output is relatively slow compared with the video signal format. In effect, this means the screenful of printer data is read-into the TVA memory rather slowly, while its monitor-ready video signal is read-out very much faster. This is merely an engineering consideration that leaves the essence of my invention's objects unscathed.

Albeit a substantial compromise in video format, this variant approach for practicing the essence of my invention is comparable in usefulness to initiating a SHIFT+PRINT_ SCREEN directive to send data to a hard-copy printer. In my invention's practice the information "prints" instead to my invention's TVA and is retained in the TVA memory and subsequently read-out onto the screen of the second display monitor.

Utilizing the printer-equivalent output for my TVA's video source does provide the computer user with a preview of what a hard-copy printout might look like. As a result, editing of layout and other factors may be exercised prior to "wasting" an actual hard copy printout.

Remarkable Use with Individual Workstation

Workstations, or individual computer systems, which are networked in an intranet with a central server that ordinarily holds many files in a common data storage facility may substantially benefit from my invention's application. It is frequently beneficial for a network user to have an ability to uniquely display and hold an individual frame of data on a separate slave type video monitor for more convenient reference, comparison or editing purposes. In other words, a user of a workstation tied into a network can divert the workstation video to my invention's TVA and subsequently view a predecessory workstation screen on a secondary monitor.

A keynote advantage of this usage of my invention with a typical workstation is that aside from providing the user with a reference display of a document on the secondary monitor, it accomplishes this goal without tying up network resources. This network oriented, shared database use of my TVA and a separate monitor screen is a fundamental characteristic of my invention that is just as important for the workstation user as it is with an individual user of a stand-alone personal computer.

FIELD OF MY INVENTION

My invention pertains to computer systems which display information on video monitors and most particularly to personal computers, personal office computers and individual workstations, including those which are networked with a server or mainframe. I tend to focus this invention's teaching towards IBM-compatible computers and workstations typically using Intel, AMD or Cyrix architecture microprocessors merely because this is unequivocally the most popular and widely used PC hardware at the time of my invention. My invention is equally applicable to other less popular systems, including the Apple Macintosh® and iMac® which, while being little more than a niche computer having a relatively tiny installed market share, can clearly benefit from multiple-display service for better user convenience.

Various Operating Systems

More importantly my invention applies to a plethora of operating systems including various versions of Microsoft Windows®, Apple-OS and IBM OS/2. It also applies to non-windows system programs such as UNIX, LINUX, CP/M86, MS-DOS, Sun-OS and a variety of other proprietary operating systems.

The underlying intent of my TVA invention is to intentionally redisplay a predecessory screen of video derived from a processed video line ordinarily coupled between a computer and a monitor. The TVA device works equally well with and affords about the same operational benefit to both windows and non-windows applications programs.

SUMMARY

Secondary Monitor for Predecessory Display

A secondary video display monitor of ordinary design is typically used in conjunction with my Translative Video Adaptor (TVA) to grab and indefinitely store individual selected frames of data ordinarily delivered to the usual computer's main monitor. In other words, it is the TVA device alone which supports the essence of my invention and the applicable to secondary monitor may be universally picked from an array of screen sizes and features as provided by any number of makers. The stored data are subsequently read-out and displayed on the secondary (i.e., supplementary or satellite) monitor to serve to display full screens of pre-occurring reference information which enables a user to conveniently evaluate or edit other usually immediate program data which are subsequently displayed on the computer's main (i.e., primary or first) display monitor.

Translative Video Adapter

I have coined the term Translative Video Adapter (TVA) to succinctly phrase it's technical performance. In effect, my TVA accepts the processed video signal from the computer, firstly translates the video signal into a binary format for digital memory storage. The digital memory is subsequently read-out and the retrieved binary format data is then secondly translated back into a reconstructed processed video signal format that serves to drive the secondary, or antecedent display monitor and closely replicate the predecessory screen of data.

A TVA Card is Not a Video Card

As an adjunct to a computer utilizing a VGA (video graphics array) or equivalent display, my TVA may be conveniently built upon a plug-in printed circuit assembly which is temporarily inserted into one of the available expansion bus slots ordinarily associated with a typical personal computer (including Compaq, Packard-Bell, Acer, Dell, AST-Research, Gateway, and Hewlett-Packard PC clones based upon or compatible with an original IBM-PC, IBM-AT or IBM-PS/2 design). In an unequivocal distinction between my TVA and prior "video adapter cards", I preferably interface the processed video signal directly.

A jumper cable may couple directly between my TVA card video input and the computer's usual VGA type of video display card's analog video output terminal. The jumper cable serves to convey analog RGB (red-green-blue) processed video signal levels from the video display card's usual output directly to my TVA card's input. In this arrangement a principal advantage resides in the ability to obtain necessitous operating power levels directly from the internal expansion bus connector.

The original or principal VGA video monitor is subsequently plugged into a connector provided on my TVA card. A separate sample of each of the analog R,G and B video signals is grabbed by an input of each of three high speed video ADC (A/D converters). The digital output from the ADC is then coupled with a video memory bank which is appropriately sized to hold the necessary video data bytes for supporting at least one full video frame. The memory is repeatedly read out to three video speed DAC (D/A converters) which return the video signal back to its analog RGB signal format for application to the secondary VGA video display monitor.

TSR Routine Enables Predecessory Frame Grab

Video frame grabbing can be initiated by the user through a unique keystroke sequence (say, ALT+SHIFT+PRINT_SCREEN) producing an unique PC keyboard scan code sequence (i.e., 38+2A+E0_2A E0_37 and hereinafter called Alt_Shft_PScr) manually entered via keyboard and coupled through the computer's main data bus. A TSR (transient stay resident) software subprogram compatible with the installed operating system is ordinarily utilized to act on the selected keystroke recognition. The TSR instructions may be transparently setup in the computer's high memory through installation of a suitable code line in the computer's usual AUTOEXEC.BAT or equivalent batch file.

My TVA device, when embodied as the mentioned to plug-in card, may be particularly convenient when the computer is intended to service CGA (color graphics adapter), EGA (extended graphics adapter), MGA, (monochrome graphics adapter, such as Hercules), or even ASCII-based MDA (monochrome display adapter) dependent display monitors. These earlier types of monitors continue to find substantial, albeit dwindling commercial usage, particularly for database, data entry, programming code preparation and basic word processing applications.

Faithful Rendition of Predecessory Screen Display

The eloquence of my invention is that a faithful duplication of whatever video processing the computer's usual built-in video circuitry provides is absolutely duplicated so as to precisely replicate the primary display presentation on the secondary display monitor. Ordinarily, a frame of video is grabbed and stored in my adaptor's video memory in response to instructions received from a software TSR routine in recognized response to a unique keystroke sequence such as the mentioned Alt_Shft_PScr (example) routine. Otherwise, in absence of software provision, the TVA may be triggered to grab a frame of video signal ordinarily routed to the principal monitor in response to actuation of a portable keybutton-switch, additional mouse-button, or the like usually located near or includable as part of the user's keyboard. The memory stored signal is then continually read-out and buffered to suitable video signal levels and fed to the secondary display monitor where it is accurately rendered for content, color and shading. This provides a true image for the operational convenience of the user.

External TVA Device is Flexible

An external TVA may be provided which intermediately couples between the computer's usual VGA video adapter's DB-15 video OUTPUT receptacle and the VGA or SVGA video display monitor signal line plug. In this preferable arrangement, the video signal coupled with the TVA is ordinarily in analog format and suitable A/D (analog to digital) conversion is performed. A video memory stores data sufficient for at least one complete video frame. At a minimum a 640×480 pixel frame may require about 692 kilobytes of memory to support 256 colors, while a 1024× 768 pixel frame may require at least 5.3 megabytes or so of storage for the same extent of color resolution. The stored memory output data are subsequently utilized with a D/A (digital to analog) converter to reconstruct the analog video signal for immediate coupling with a separate secondary video display monitor. In this arrangement, a separate manual "update" key-switch convenient to the operator may be actuated to grab a new frame for storage and display on the secondary monitor. Conversely, a connection between the TVA and a serial COM port might be utilized together with a TSR software routine to obtain operation from a unique keyboard entry combination, such as the mentioned Alt_Shft_PScr routine which encourages a frame grab trigger signal to deliver from the COM port.

A similar external adaptor may also be readily designed to couple with the TTL signal level video monitor output lines provided on many earlier personal computers. Since the usual video signals are inherently binary in these earlier display monitors, they do not require A/D conversion but rather can obviously be engineered to couple directly with the memory. The output of the memory is then read-out and further conditioned back to a TTL level appropriate for application to the secondary TTL level video display monitor. A separate key-switch located near the operator, or an additional mouse-button may be actuated to grab a new video frame or screen for storage and display on the secondary, monitor. Alternatively, a control signal connection between the TVA and an output port such as the usual serial COM port or USB port might be established together with a software TSR routine to establish operation from a unique keyboard entry sequence, such as the said Alt_Shft_PScr routine.

Character Based Monochrome Display

Some widely used computer applications utilize straight ASCII-character based monochrome displays. Each character is usually 1 byte, and a typical 80 column, 25 line display produces a maximum of 2,000 characters per screen, necessitating temporal TVA storage that may be readily satisfied by a modest 16,384 kilobit (2,048×8 bits) RAM device.

Alternating Monitors

Although I have thus far I have described my invention in terms of a primary display and a secondary display (or several secondary displays), I also anticipate my invention to include alternation of monitors. What this means is that two or more monitors may be used wherein the screen image on the most recently activated monitor becomes the predecessory monitor upon command initiated by the user. As a result the lowest order predecessory monitor becomes the primary monitor.

| OPERATION WITH TWO MONITORS | | |
|---|---|---|
| User Action | Monitor No. 1 | Monitor No. 2 |
| Edit | Primary | View 1 |
| Next | View 1 | Primary |
| Edit | View 1 | Primary |
| Next | Primary | View 1 |

| OPERATION WITH SEVERAL MONITORS | | | |
|---|---|---|---|
| User Action | Monitor No. 1 | Monitor No. 2 | Monitor No. 3 |
| Edit | Primary | View 1 | View 2 |
| Next | View 1 | View 2 | Primary |
| Edit | View 1 | View 2 | Primary |
| Next | View 2 | Primary | View 1 |
| Edit | View 2 | Primary | View 1 |
| Next | Primary | View 1 | View 2 |

These charts depict the multi-monitor action. Under User Action, Edit infers the user is presently working on the document. Next infers the User having entered a "screen grab" instruction. Under Monitor No. 1 (2 or 3) Primary means the display is active, e.g. the one being edited. View 1 means the predecessory screen data just preceding the current Primary view. View 2 means the predecessory screen data just preceding the current View 1. Obviously this scheme for multiple displays is extensible to any reasonable number of monitors.

Hardcopy Printout Replication

An external adaptor may be provided which obtains "hardcopy" or equivalent data from the computer's parallel LPT port or serial COM or USB port. In this arrangement, the video display signal which may be provided to the secondary display monitor is specifically limited to that level of information which is ordinarily sent to a printer when a usual SHIFT+PRINT_SCREEN keyboard entry is made. The binary signal provided through the parallel or serial port is conditioned and sent to the DATA input lines of a memory having sufficient capacity to store data for at least one screen of information. Initial occurrence of the screen print signal on the printer output COM or LPT line may be singularly sufficient to trigger storage of the subsequent data. Alternatively, a programmer may create a TSR software routine which can be installed in the computer to enable redirection of immediate principal video display monitor data to the appropriate COM or LPT port through keyboard entry of a unique keystroke combination, such as the Alt_Shft_PScr routine.

OBJECTIVES

An objective of my invention is to sample and store a selected screen of processed video ordinarily coupled with a primary monitor and thereafter continue to display the selected screen sample on a secondary monitor.

Another objective for my invention is to utilize a processed video data flow between a computer and a primary display monitor as a source of data which may be sampled, stored and subsequently retrieved for later display on a secondary monitor.

An outstanding aspect of my invention is to enable multiple monitor display utilization with substantially any operating system, including all versions of Windows®, MS-DOS, Unix, Linux, CP/M86, and Mac-OS® running on any personal computer or workstation platform utilizing an accessible processed video signal line (such as VGA) coupled between a video signal processor and a display monitor.

Yet another goal for my invention is to provide a user with a current and previous display of a working document on separate primary and secondary monitors utilizing a stored replication of the processed video signal as ordinarily coupled with the primary monitor to develop the secondary monitor's display.

An extended object for my invention is to allow "display rotation" where the primary display and secondary display alternate back and forth between a first monitor and a second monitor as the user advances through successive screens of the work document.

Another convenience provided by my invention is to enable the storage of several predecessory screens of information any one or more of which may be re-presented on the secondary monitor in response to a user's command.

A fundamental intent for my invention is to adapt an individual frame or screen of processed video data signal flow between a computer and a primary display monitor into a storable data format and subsequently read back the stored data in a replicate processed video signal form suitable for followup display on a secondary display monitor.

Still another objective for my invention is to teach other artisans the essence of a translative video adaptor TVA which may be implemented in an unobtrusive form to intercept or grab frames of processed video signal flow between a computer and a primary display monitor whereupon the grabbed video signal frame data is temporarily stored and subsequently read-out to provide a true display of the grabbed video signal information on a secondary monitor subsequent to change of the primary display monitor data presentation.

A key object for my invention is to provide at least dual monitor display of a computer's processed video, whereby the first monitor's display is current and the second monitor's display is replicate of a screen display precedingly presented on the first monitor.

An economic object of my invention is to enhance computer usability and convenience with several monitors wherein one displays an immediate video screen and another displays at least one predecessory screen of data while the overall system requires a very low threshold of computer operator skill in order to obtain a most economic level of benefit from the enhancement.

A most versatile object for my invention is to provide multi-monitor display of current and predecessory screen data with any class of operating system running any version of applications software, whether Windows® capable or not, as installed in nearly any computer platform extending from the original 8086/8088 microprocessor through the best Pentium-III or later-art microprocessor based motherboard hardware and including "mainframe" systems and other small computers such as the 68000 or 603e microprocessor based Apple and Macintosh® systems.

A functional object for my invention is to be couplable into the processed video signal line (cable connection) usually extensible between a computer's video processor output and the computer's video display monitor input and furthermore providing for the necessary installation with a minimum of technical skill on the part of the installer.

DESCRIPTION OF DRAWINGS

My invention is depicted on 14 sheets of drawings showing 17 figures.

FIG. 8A—Write first then Read sequence for system using a secondary and tertiary monitors.

FIG. 8B—Alternate Write/Read sequence relative with that of FIG. 8A.

DESCRIPTION OF INVENTION

Figure 1:
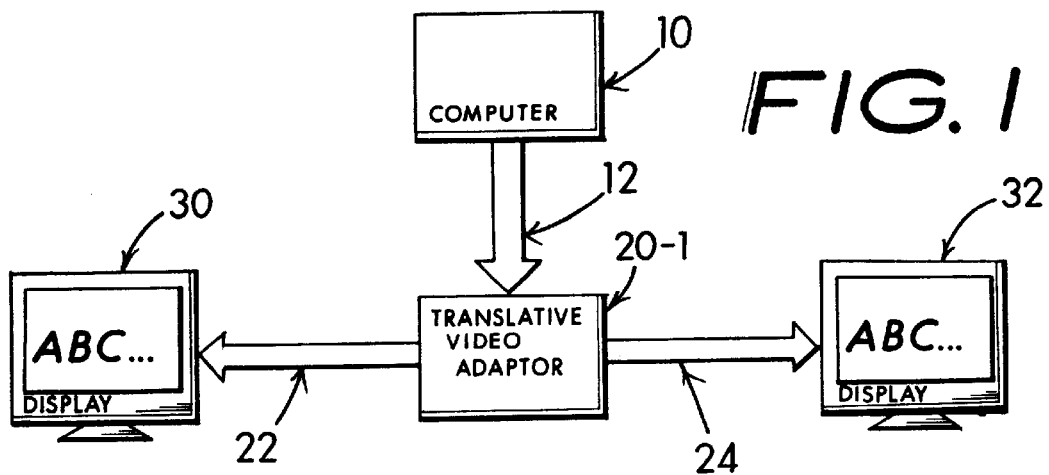
FIG. 1—Primary and secondary monitors display same video data.

A computer 10 (including at least usual CPU, RAM, ROM, keyboard and mass storage elements) is shown in FIG. 1. A first screen of processed video data signal which ordinarily drives a separate display monitor appears on line 12 and couples with the input of my TVA 20-1. The TVA provides two outputs, line 22 which is substantially content-equivalent to the data on line 12 feeding a primary monitor 30 displays the computer's immediate video signal data, while video signal data on line 24 is processed through the TVA.

In this particular depiction, the video data on line 24 is similar to that on line 22 and therefore the displayed data ABC on the secondary monitor 32 is essentially a replica of the displayed data ABC on the primary monitor 30. The FIG. 1 depiction shall underscore a key aspect of my invention, that being the TVA 20-1 is functionally distinct from the computer 10 and the only video signal received by the TVA is the processed video data signal delivered by the computer on line 12. Furthermore, the processed video data signal delivered from the computer is a display-ready video signal which has been processed through a video adapter or "graphics accelerator" card.

Figure 2:
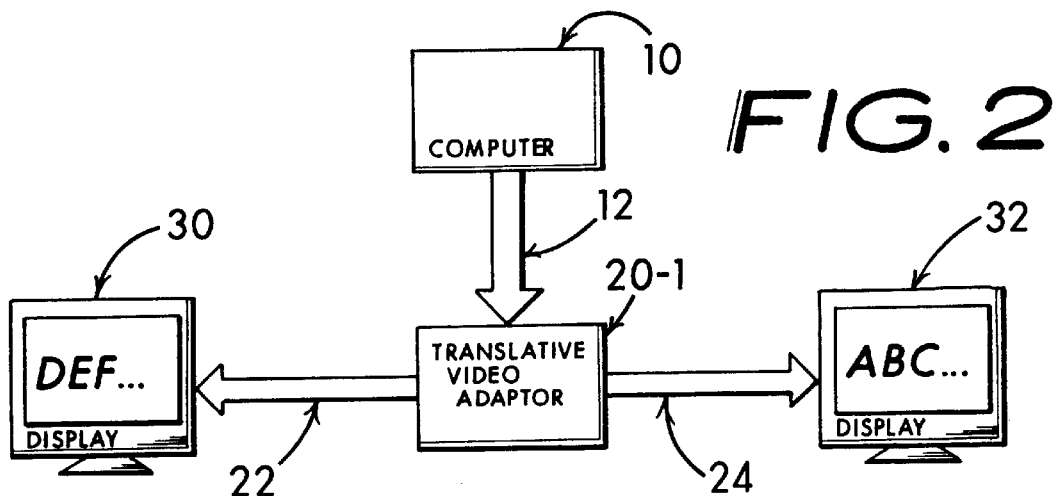
FIG. 2—Primary monitor displays new video data while secondary monitor continues to display antecedent (predecessory) data.

In FIG. 2 the TVA 20-1 receives a second screen of the processed video data signal originating from the computer on line 12. The realtime video data is immediately passed to the primary monitor 36 where it is displayed as the second screen data DEF while the TVA serves to store a first screen sample of the processed video data signal as a predecessory data representative of the original or first screen of information. The stored predecessory data is subsequently readout and replicated as the first screen of the processed video data signal. Subsequently coupled 24 with the secondary monitor 32 it continues to display the first screen of stored video data ABC and the display may continue to be viewable by a user.

Figure 3:
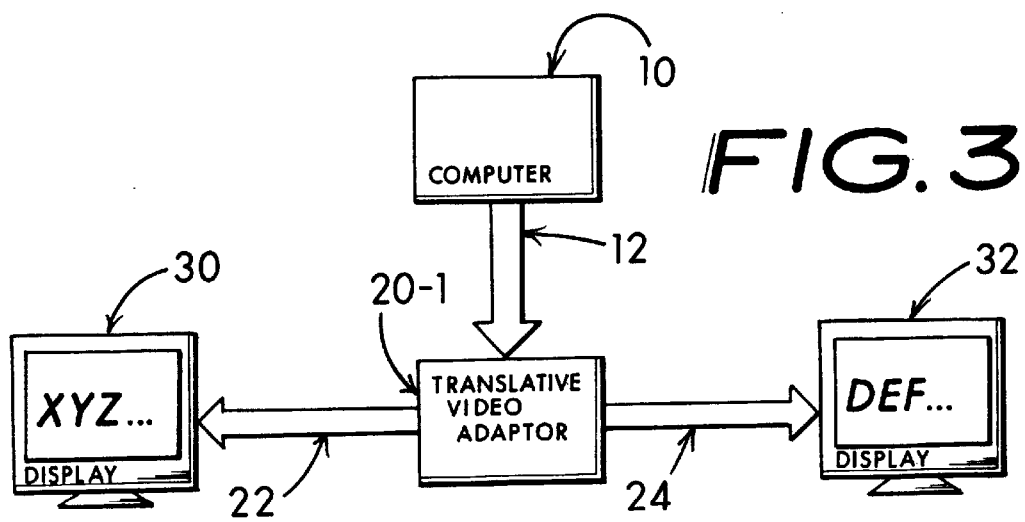
FIG. 3—Primary monitor display advances to show other new video data while secondary monitor continues to display predecessory data.

The TVA of FIG. 3 continues to receive the processed video signal data on line 12 as a succession of video screen advances from the computer 10 where the most current information, for example a third screen data XYZ, is fed to and displayed on the primary monitor while the earlier viewed second screen data DEF is stored in the TVA and used to provide antecedent (second) screen of processed video data signal for the secondary monitor 32.

Figure 4:
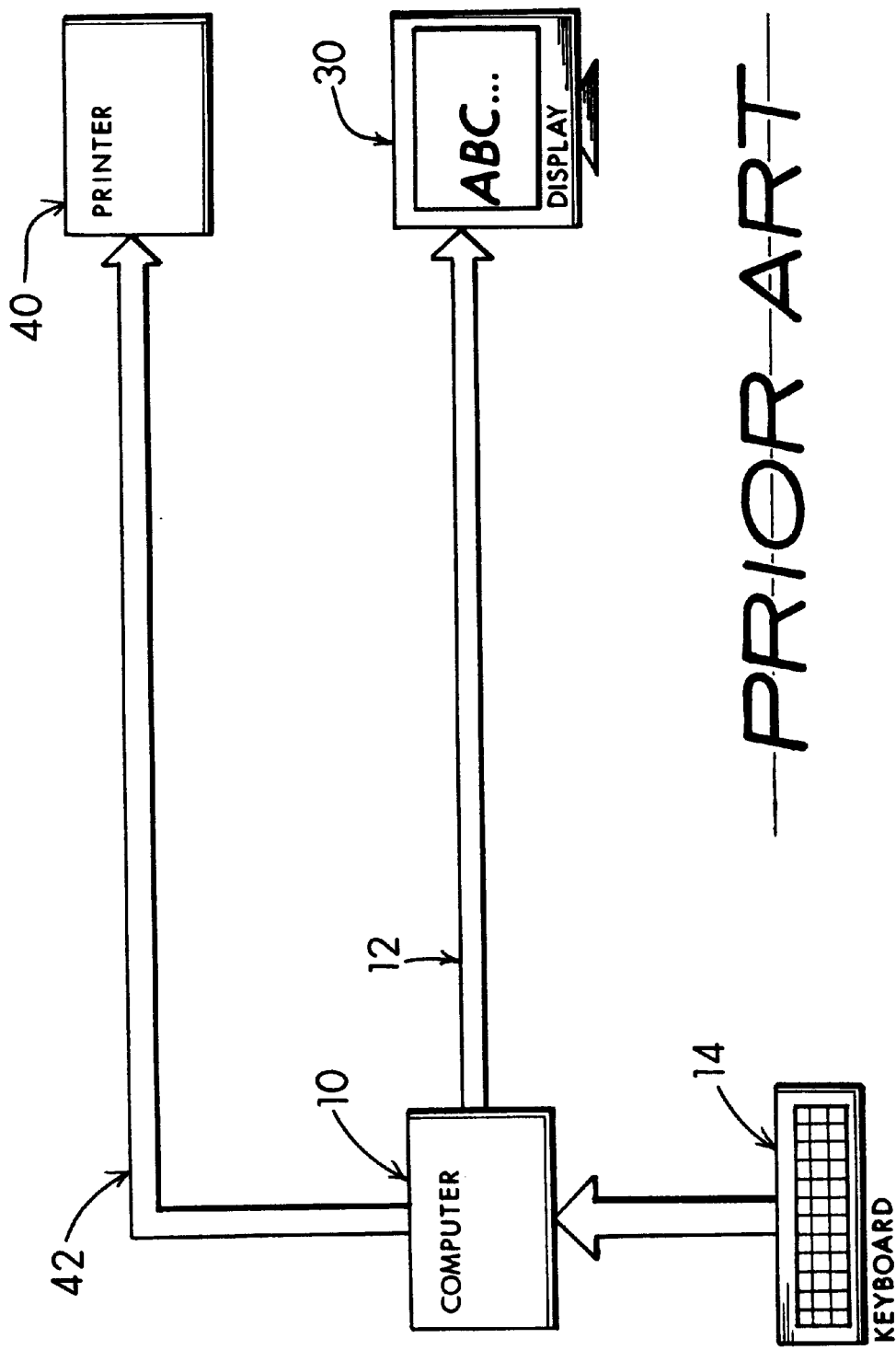
FIG. 4—Prior art arrangement of a computer, monitor and printer.

A PRIOR ART representation of a contemporary PC (personal computer) or office computer is shown in FIG. 4 to include a computer 10, a processed video signal line 12, data entry keyboard 14, primary display monitor 30, printer signal line and printer 40. Together these devices provide a versatile, highly utilitarian arrangement which can store data, create and edit documents, maintain bookkeeping records, enable game playing, send and receive fax data, provide internet connection and a variety of other everyday purposes. As shown in this hookup, only one display monitor is ordinarily used and it simply displays current information stored in the computer's video memory.

The representation of FIG. 4 is meant to comprehensively include any of a variety of user interfaced computers. This shall include computers which may be used as workstations in conjunction with a network (not shown) in accord with well known practice.

Generally, two principal categories of "small" computer architecture prevail at the time of this invention. One is a category of computer's originally developed around the Intel 8086 microprocessor as manufactured by hundreds of makers and collectively known as "IBM-PC" compatible designs. The other less significant category is the Macintosh® or iMac® made solely by Apple Computer. The invention is applicable in a broader sense to any computer system having an external monitor (dumb terminal) in which a display-formatted processed video data signal is submitted from the computer to the monitor.

Figure 5:
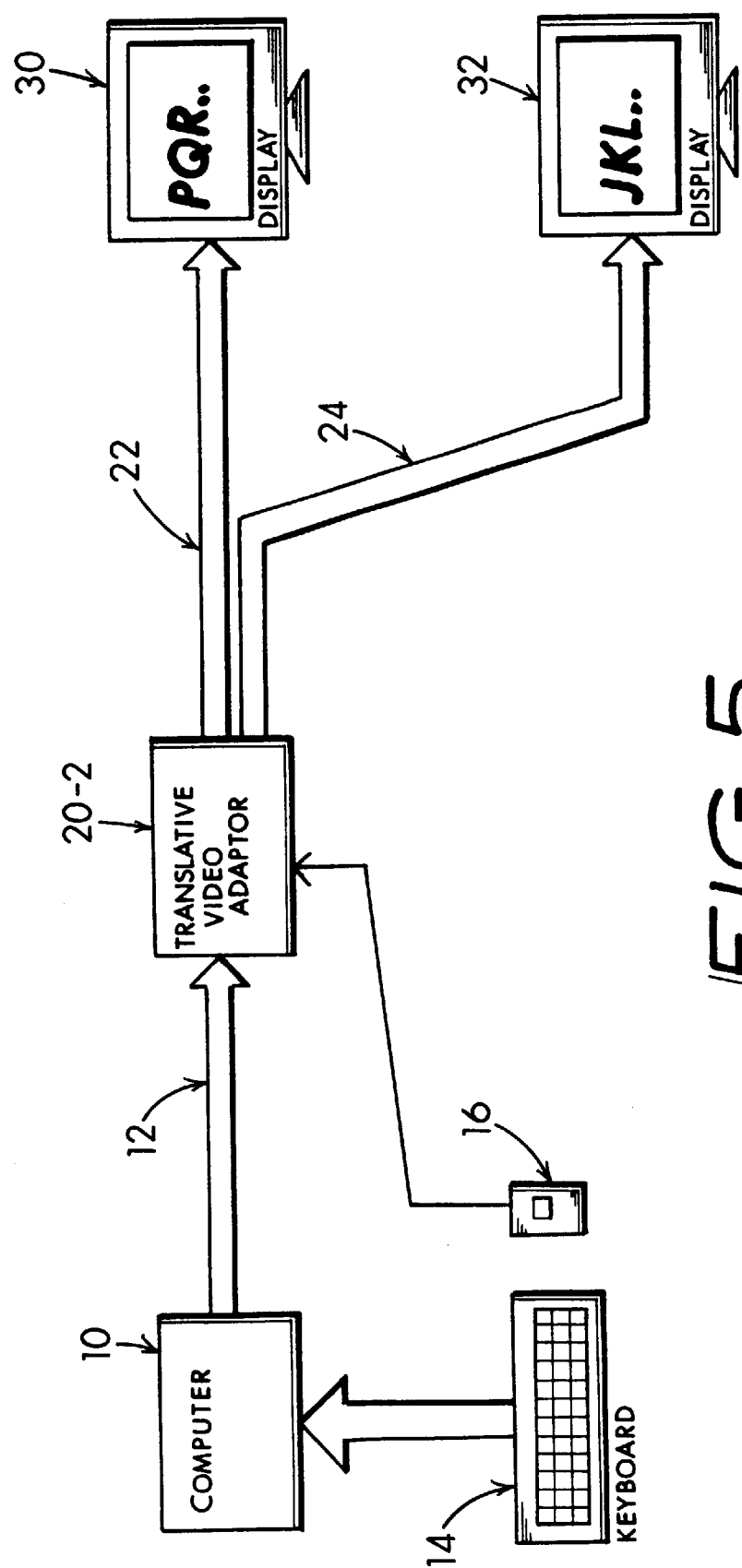
FIG. 5—Computer used with a TVA coupled with the computer's processed video output and including an auxiliary secondary display selection key-switch.

In FIG. 5 my TVA 20-2 couples via the processed video data signal lines 12 and 22 between the computer and the primary monitor 30 where a fifth screen of data PQR. This primary monitor display typically represents data processed contents and an immediate working document display resulting from a software program running in the computer 10.

Another video output 24 signal line drives a secondary monitor 32 which, instead of displaying the immediate working document display, serves to display a full screen of stored antecedent information shown as a fourth screen of data JKL which a user can employ as a reference or for other purposes relative with the primary screen information. Predecessory screen data displayed on the secondary monitor 32 is useful for various computer applications. In particular the user entered keyboard 14 actions may be immediately shown on the primary monitor 30 and compared with another document, or an unchanged version of the same document which appears an an antecedent display on the secondary monitor 32. This capability is invaluable for a variety of everyday computer applications, such as while editing a document in a wordprocessor, data file or spreadsheet application. In this hookup depiction, an accessory key-switch 16 is typically made accessible to the keyboard operator and pressing the key-switch initiates a grabbing of the immediate video signal data on line 12 for storage, readout and subsequent predecessory display on the secondary monitor 32. For example, I have found that the key-switch 16 may be included as a "third button" in a mouse and either hooked directly to the TVA 20-2 as shown, or else looped through the computer 10 and coupled with the TVA (not shown).

Figure 6:
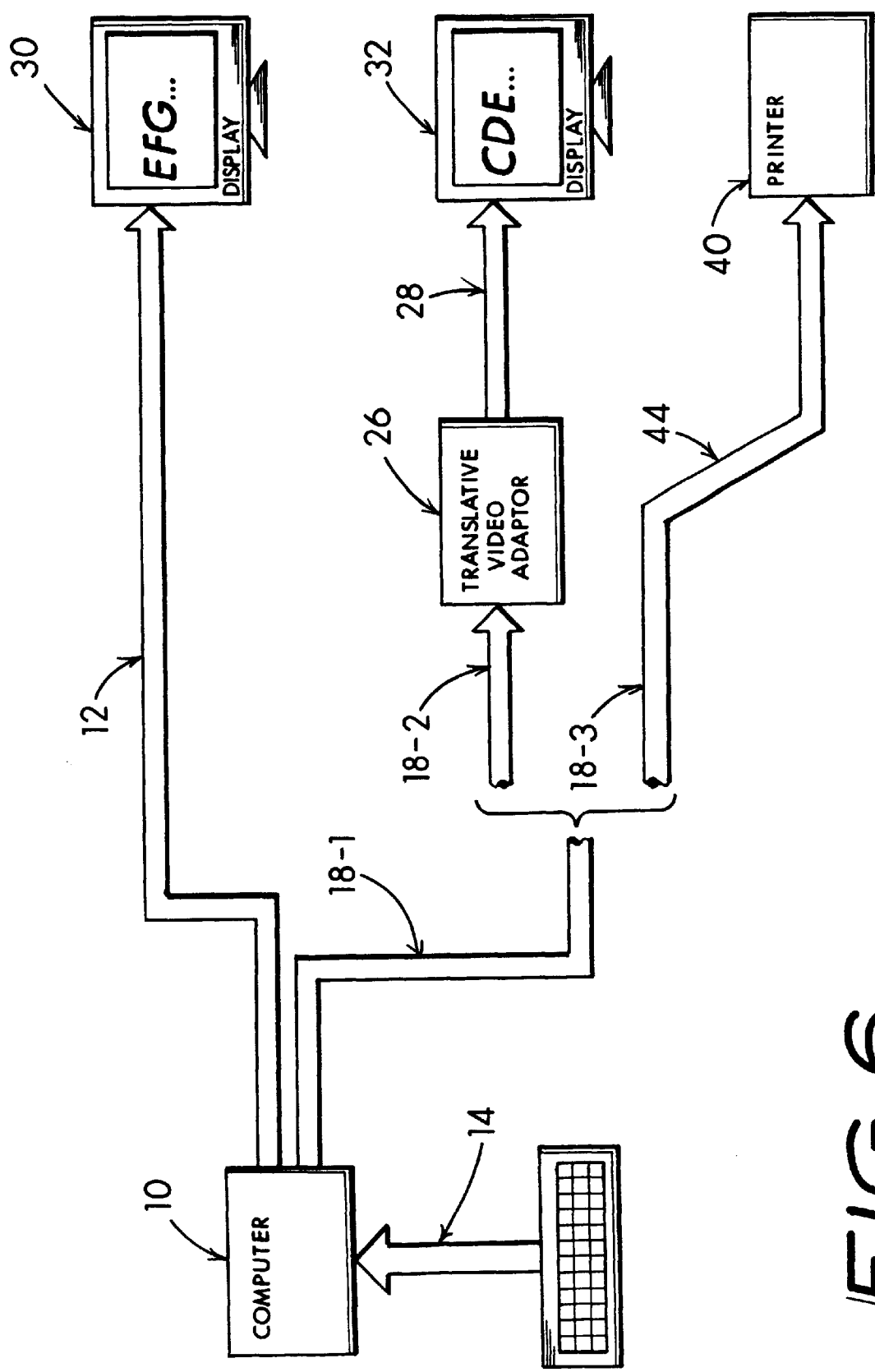
FIG. 6—Operation of TVA from computer's usual printer port.

The computer 10 of FIG. 6 provides a usually printer graphics formatted printer signal on line 18-1 which may couple via line 18-3 with a dot matrix, inkjet or laser printer 40. Keep in mind however, that aside from being graphics formatted the signal on line 18-1 may also provide straight ASCII characters that may be printable, as well as serve various control functions for the printer. Alternatively, the line 18-1 data may be coupled with line 18-2 and provide a printer graphics formatted or ASCII formatted version of processed video data signal input to my TVA device 26. The TVA is configured by design to store and subsequently retrieve the processed video data signal and reconstitute it as a true replication of the SHIFT+PRINT_SCREEN originated primary monitor's screen view. As a result, a video signal is produced on line 28 representing a full antecedent primary monitor screen display of computer 10 information which is promptly displayed on the secondary monitor 32. It is shown that the primary monitor 30 may have an immediate display EFG, while the secondary monitor 32 may display a predecessory screen CDE of information.

Figure 7:
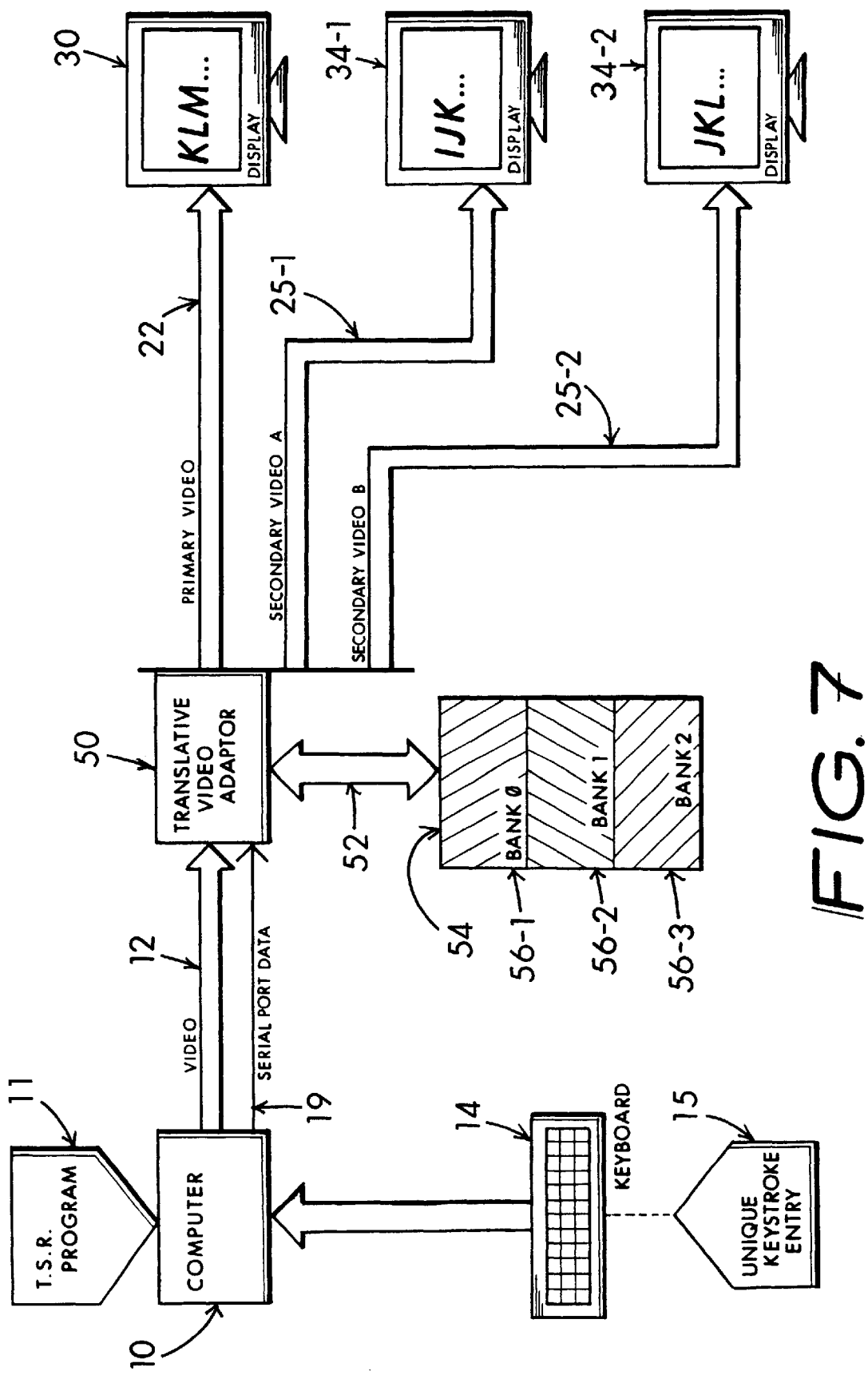
FIG. 7—Computer used with a TSR program and providing TVA control of multiple secondary displays selected by control signal delivered on USB or standard serial port.

The computer 10 of FIG. 7 provides the video signal 12 to my TVA 50 and subsequently the realtime video signal couples via line 22 with the primary monitor as a display screen KLM In this hookup, a TSR software program 11 is appears loaded into the computer 10. The keyboard 14 subsequently becomes responsive to a unique keystroke entry 15, such as the Alt_Shft_PScr earlier mentioned sequence. It is the purpose for the TSR program to recognize and translate keystroke sequences into FSC (frame selective control) signals which may output through the computer's serial port on line 19 and couple with the TVA 50. This signal bus is typically a conventional RS232C or Universal Serial Bus USB connection, customarily or at least often denoted as a COM port. As a result, the video frame grab signal developed on line 19 is entirely independent from any signal states on the video line 12.

The TVA serves to grab the desired current screen of data and store it in a memory 54 coupled to the TVA via data bus 52. I show the memory 54 partitioned so as to include three separate memory banks. For this illustration, say the first grabbed signal is currently stored in BANK-0 56-1 and a second grabbed signal is nextly stored in BANK-1 56-2. The TVA may then readout the BANK-0 data to couple 25-1 with a secondary monitor 34-1 to produce a second level of data display IJK and readout the BANK-1 data to couple 25-2 with a tertiary monitor 34-2 to produce a third level of data display JKL, each of which are earlier in time sequence with the immediate screen display KlM shown on the primary monitor 30. Subsequently if a third FSC signal occurs on line 19, the data on video line 12 is written into memory BANK-2 56-3 and when the write step is complete, the display data maintained in the latest BANK-2 memory store are converted to readout and supplant the earlier data readout obtained from the memory BANK-0 and coupled with line 25-1. In this manner, the memory banks are effectually rotated so that necessitous readout may occur after write-in is fully completed. This virtual rotation of memory banks serves to improve display cosmetics in that the actual display change does not occur until a full screen of data has been transferred into the pertinent memory bank. This FIG. 7 depiction shows how several secondary display monitors 30,34-1,34-2 may be utilized to provide many simultaneous screens of information which may vary in content.

A preferred sequence of secondary and tertiary monitor display is shown in a chart of FIG. 8A. Three banks of memory are shown (Bank 0, Bank 1, Bank 2) which are written into when a primary display screen of data is selected. I show (by way of this example) the succession of each of the selected primary screens and their subsequent writing into memory as step W1 through W12, representing the antecedent supplementary display screens 1 through 12. Readout is depicted as R1 for the secondary monitor and R2 for the tertiary monitor. In this arrangement, the most recent antecedent display appears on the secondary monitor 34-1, with the tertiary monitor 34-2 display showing the second most recent antecedent display. With TIME at 0 (zero) indicating system startup, the X in Bank 1 and Bank 2 memory positions denotes that no previous readable data is present and secondary or tertiary monitor readout is unavailable. I find it advantageous (in video circuits associated with my TVA) to provide a screen blanking of the secondary and tertiary monitors when no valid video data is available, as represented by the "X".

An alternate, but in essence equivalent, sequence of secondary and tertiary monitor display is shown in FIG. 8B. In this arrangement the first or ODD selected screen of data appears on the secondary monitor (readout R1) while the second or EVEN selected screen of data subsequently appears on the tertiary monitor (readouts R2). This pattern continues, with the continuation of ODD and EVEN selections shifting respectively between the secondary and tertiary monitors.

Figure 9:
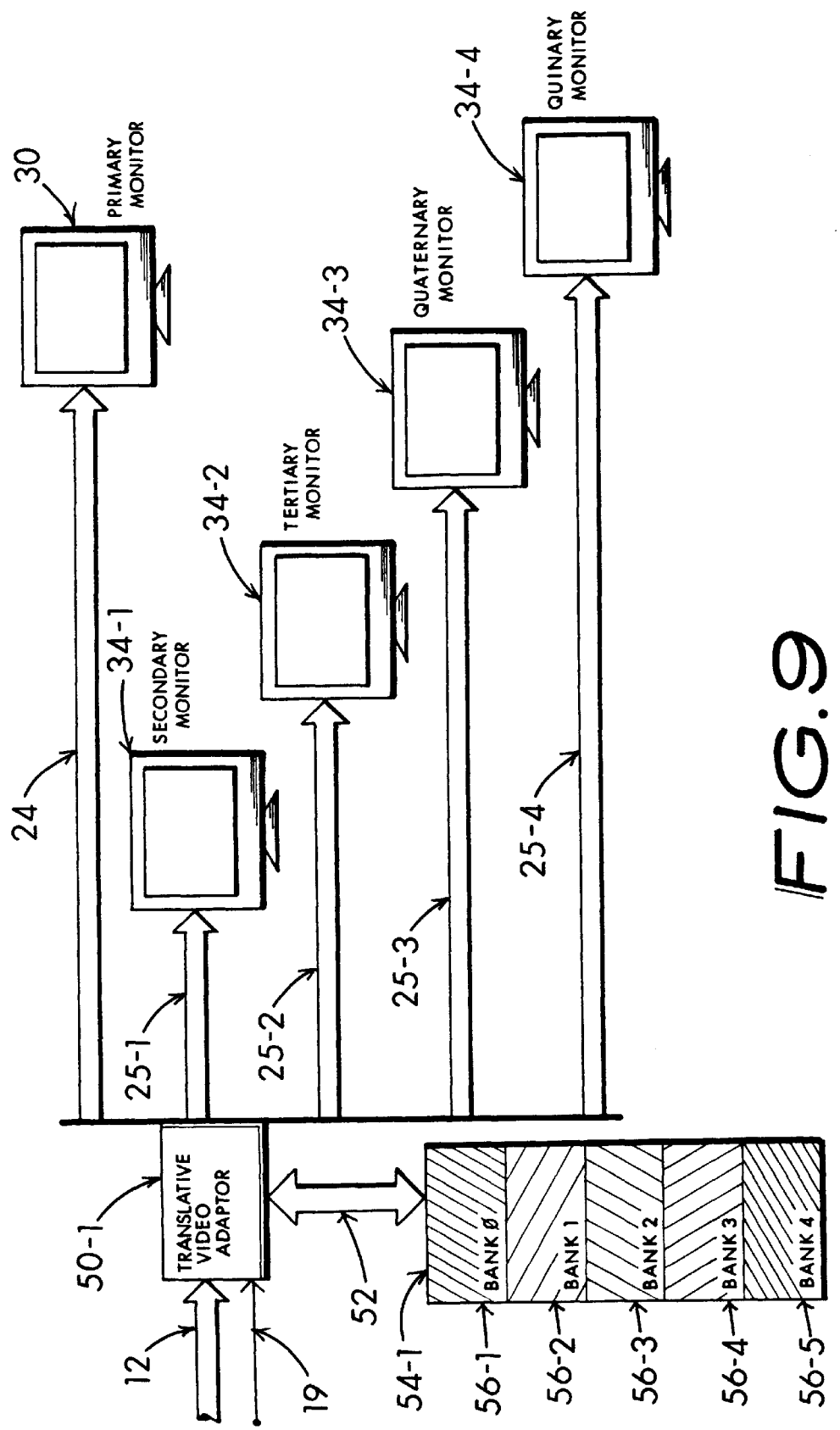
FIG. 9—Hookup showing addition of quaternary and quinary monitors.

In FIG. 9 I show a hookup for a quaternary monitor 34-3 and a quinary monitor 34-4 extension to the hookup of FIG. 7. Together with the secondary monitor 34-1 and tertiary monitor 34-2, this arrangement embraces a total of five monitors, including the primary monitor 30. The quaternary and quinary monitors obtain antecedent video data on lines 25-3,25-4 from the TVA 50'. I also shown that the video memory 54' associated with the TVA includes additional memory storage BANK-3 56-4 and BANK-4 56-5 in support of the additional predecessory display monitors.

Figure 10:
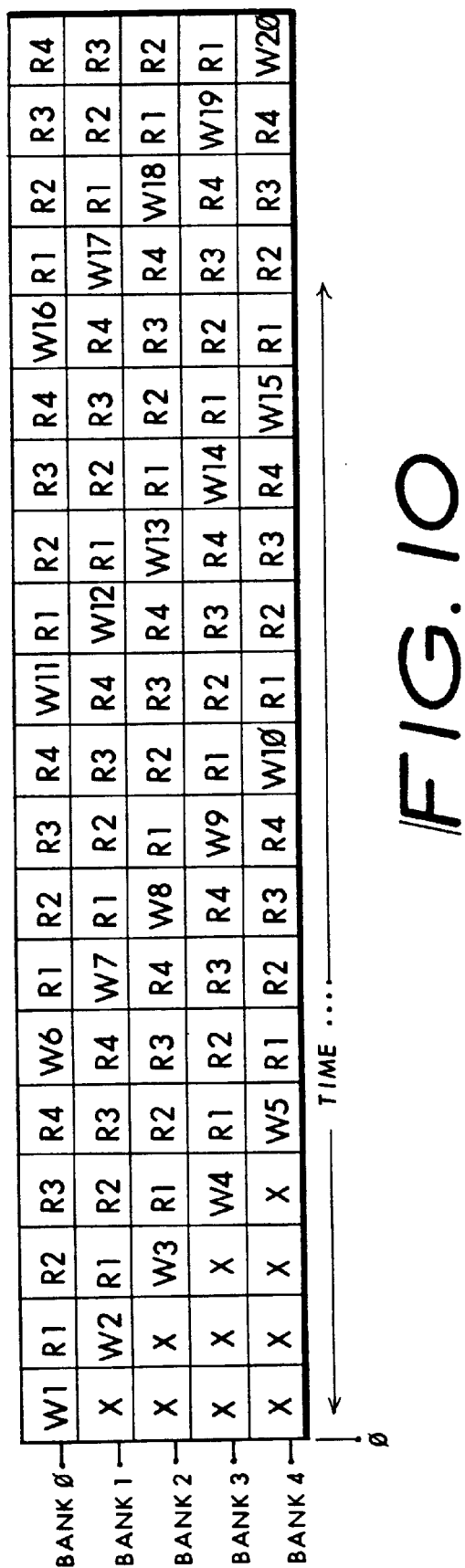
FIG. 10—Write before Read sequence for system using four antecedent levels of supplementary monitors.

A preferred WRITE and READ pattern for the four supplementary monitors is shown in a chart of FIG. 10. In this showing, the antecedent displays shift from the lowest order secondary monitor to the highest order quinary monitor as new video data is severally written into the memory banks. In other words, the secondary monitor displays the most recent antecedent to screen of data while the quinary monitor shows the oldest antecedent screen of data. Looking at the chart of FIG. 10, symbols W1 through W20 represent WRITING into memory Banks 0 through 4 of FIG. 9. This further represents the writing of the first twenty of the display frames selected for antecedent display. Symbols R1 through R4 represent READING from 4 of the 5 memory BANKS 0 through 4 in a successive pattern. The READ pattern preferably satisfies the following arrangement:

R1=data for SECONDARY monitor 34-1

R2=data for TERTIARY monitor 34-2

R3=data for QUATERNARY monitor 34-3

R4=data for QUINARY monitor 34-4

As a result, the most recent antecedent data appears on the SECONDARY display with prior antecedent display data shifting from the SECONDARY display to the TERTIARY, QUATERNARY and then QUINARY displays as additional antecedent display data are selected from the PRIMARY display and subsequently displayed on the SECONDARY display. In effect, the SECONDARY display presents the most recent predecessory data screen while the QUINARY display presents the least recent or "earliest" of the four monitor presentations of predecessory data.

Figure 11:
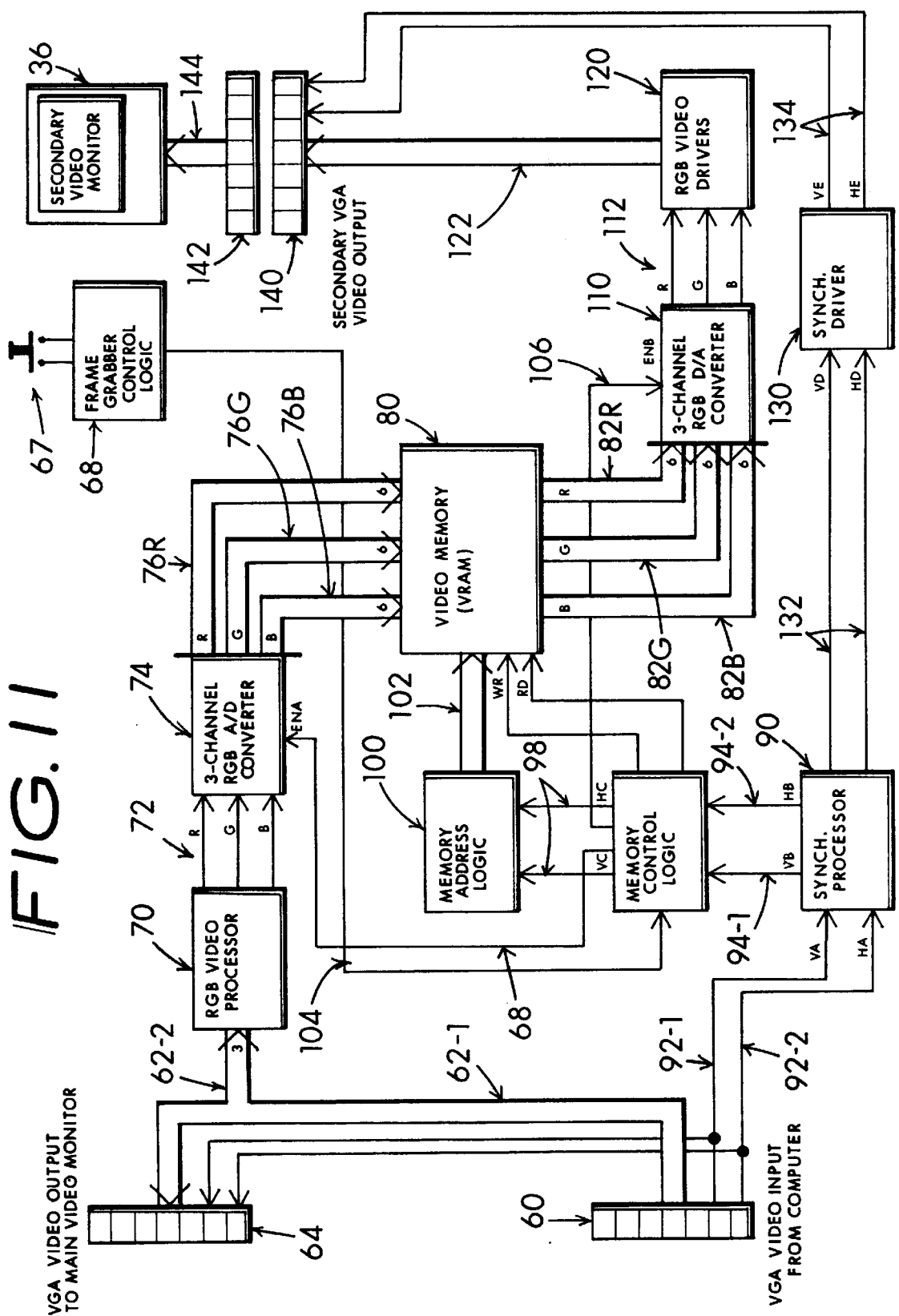
FIG. 11—Deriving TVA signals from usual computer VGA display video signal.

Looking at FIG. 11 shows a coupling 62-1 between a VGA (video graphics array) processed video data signal source connection 60 originating from the computer with a VGA video output connection 64 that couples to the primary display monitor 30.

| VGA CONNECTOR PIN TERMINALS 15-pin High Density D-Shell Connector | |
| --- | --- |
| Pin No. | Function |
| 1 | RED Video |
| 2 | GREEN Video |
| 3 | BLUE Video |
| 4 | Reserved |
| 5 | Digital Ground |
| 6 | RED Return |
| 7 | GREEN Return |
| 8 | BLUE Return |
| 9 | Plug |
| 10 | Digital Ground |
| 11 | Reserved |
| 12 | Reserved |
| 13 | Horiz. Synch. |
| 14 | Vertical Synch. |
| 15 | Reserved. |

A portion of the coupled VGA processed video data signal is branched over 62-2 to a RGB Video Processor 70 which includes video amplifiers delivering a signal on lines 72 typically to a 3-channel RGB A/D Converter 74. In a usual configuration the A/D converter may deliver 3 separate 8-bit outputs, one each for RED 76R, GREEN 76G and BLUE 76B video signals. Hence, the analog VGA signal on line 62-2 is converted into a 3 channel, 8-bit binary signal on the lines 76 which couple to the DATA input of a video memory 80. The data residing on lines 76 may be written-into the video memory 80 in response to a frame grabber control logic function 66, representatively initiated say by a push-button switch 67 or the like. This develops a "frame grabber" signal delivered on line 104 that is subsequently processed through the memory control logic 96. Realize that this analog to digital conversion and data storage scheme is presented as purely representative and that a knowledgeable engineer might substantially alter the technical detail, while still adhering to the spirit of my invention.

The VGA input from the computer also provides horizontal and vertical synchronization signals on lines 92-1, 92-2 coupled with a synchronization processor 90. Synchronization signals on lines 94-1,94-2 couple with an MCL (memory control logic) 96 which serves to coordinate the signals 68,106 for enabling the A/D converter and the D/A converter. Additional signals from the MCL provide RD read and WR write control for the video memory 80 as well as control signals 98 for a memory address logic 100. The memory address logic delivers address data on line 102 which serves the usual memory address function for the video memory 80. The RED/GREEN/BLUE data signals, appearing on the output lines 82R, 82G and 82B, delivered from the video memory couple with a 3-channel RGB D/A Converter 110 which converts the memory stored binary data into analog video signals on lines 112. The analog video signals couple through a RGB Video Driver 12-0 producing a VGA level signal on line 122 that couples with a connector set 140,142 providing a Secondary VGA Video Output on inter-connective line 144 for feeding a secondary video monitor 36. A key-switch, mouse-button or the like including the frame grabber control logic 66 may provide a control signal on line 104 which enables the MCL to functionally grab the current frame of processed video data signal content as displayed on the primary video monitor.

Find also that the processor 90 delivers two display scanning synchronization signals VD,HD on lines 132 to a SYNCH DRIVER 130. The driver delivers the vertical and horizontal drive signals VE,HE on lines 134 to the scanning circuits of the secondary video monitor 36 via inter-connections 140,142,144.

Figure 12:
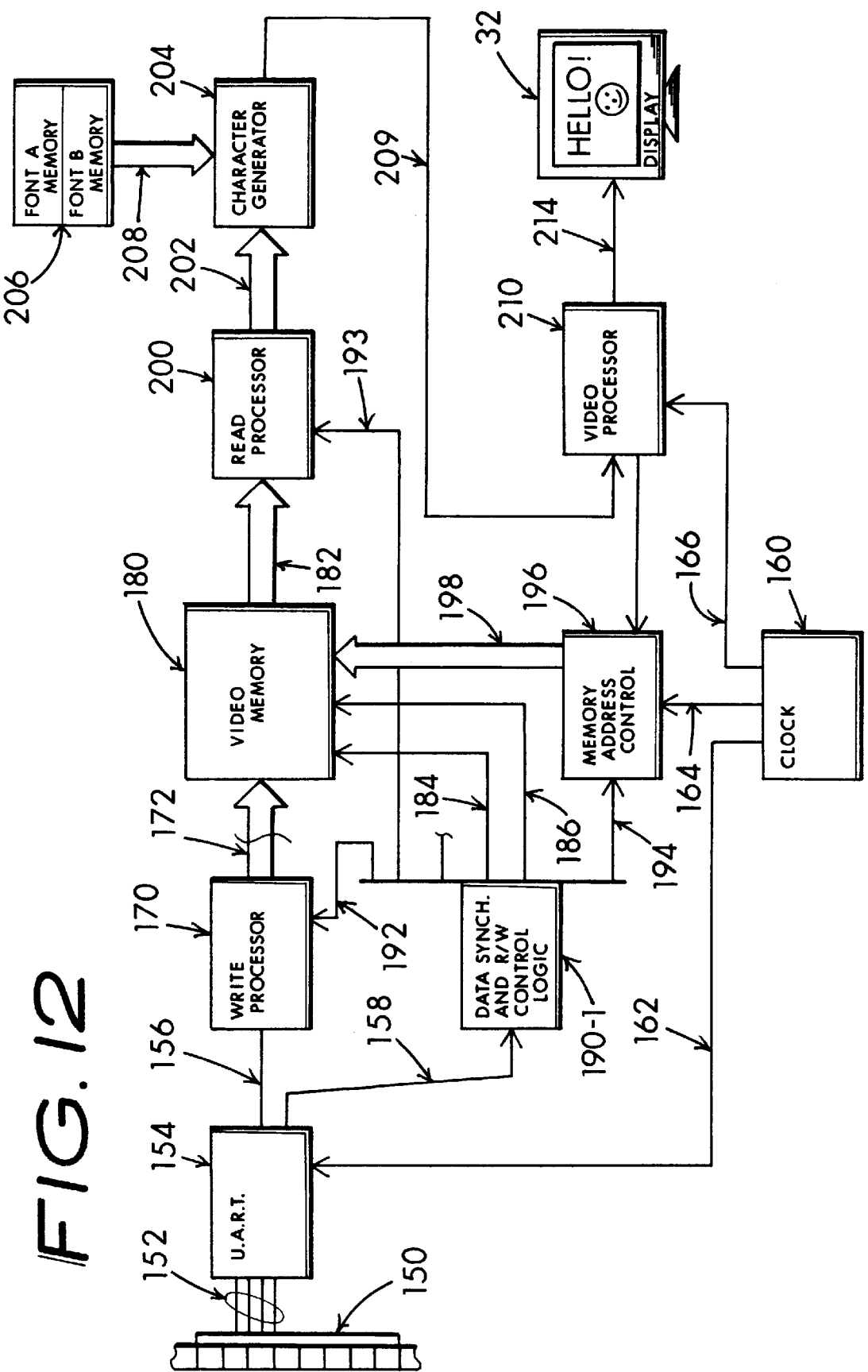
FIG. 12—Deriving TVA signals from usual computer serial printer port with software operating in graphics mode.

Connection with the computer 100 through the usual serial printer port 150 (typically COM-1) is shown in FIG. 12 whereby the serial port data couples 152 with an UART (universal asynchronous receiver transmitter) 154, such as an industry type 8250 or 16550A, the customary purpose for which is to convert the serial RS232C format data flow on the serial port into 8-bit parallel data on line 156. A clock 160 produces a necessary signal on line 162 which supports the UART.

| RS232C SERIAL PORT-COM1, COM2 (COM3, COM4) 25-pin or 9-pin Male D-shell Connector | | | |
|---|---|---|---|
| 25-pin | 9-pin | Function | Mnemonic |
| 2 | 3 | Transmit Data | TXD |
| 3 | 2 | Receive Data | RXD |
| 4 | 7 | Request to Send | RTS |
| 5 | 8 | Clear to Send | CTS |
| 6 | 6 | Data Set Ready | DSR |
| 7 | 5 | Signal Ground | GND |
| 8 | 1 | Carrier Detect | CD |
| 20 | 4 | Data Term. Ready | DTR |
| 22 | 9 | Ring Indicator | RI |

Other control signals develop on a bi-directional data line 158 which flows between the UART and the data synchronization and R/W control logic 190-1 to maintain the necessary synchronization of data flow and system handshaking. The UART output line 156 couples with a write processor 170 which generally controls flow of data on line 172 to the DATA input of a video memory 180. Control includes enabling data flow by an enable signal on line 192.

The video memory 180 is engineered to have sufficient capacity to contain the bytes of data which may comprise one full page of typical printer data, as provided from the serial port connection 150. The write data and read data control of the memory is effected by signals on lines 184,186 as derived from the R/W control logic 190-1. A signal on line 194 serves as a reset signal for a memory address control 196 that develops memory address data on line 198. The memory address control, which includes a binary counter, is clocked by a signal available on line 164. The video memory 180 read data output 182 couples with a read processor 200 which, among other tasks, control flow of read data through response to an enable signal on line 193. The output 202 of the read processor 200 couples with a character generator 204 including a font memory 206 coupled with the character generator via data bus 208. The output of the character generator on line 209 is a video data signal which inputs with a video processor 210 that includes scan synchronization, blanking and other well-known video processing functions to deliver a video signal on line 214 that may drive the secondary video monitor 32 and produce a near-replication of the selected original primary display presentation.

As depicted herein, the serial printer output signal may be initiated by a conventional SHIFT+PRINT_SCREEN instruction, whereupon a monochrome page of ANSI data may flow forth from the serial port. This would be a representative hookup whereby for an 80-column (or 80 character), 25-line screen (such as may be delivered under MS-DOS) the screen page would include 2,000 bytes (80× 25) of ANSI character screen data locations or in other words, the video RAM 180 requires a 2 KB×8 memory (2,048 bytes, 8-bits wide) in this application. Using this ANSI character format, a standard black and white MDA monitor or even an old CGA (color graphics adapter) monitor might be economically utilized as the secondary display monitor.

| MDA, CGA and EGA MONITOR CONNECTIONS 9-pin Female D-shell Connector on Adapter | | | |
|---|---|---|---|
| Pin | MDA Function | CGA Function | EGA Function |
| 1 | Ground | Ground | Ground |
| 2 | Ground | Ground | RED Intensity |
| 3 | Not Used | RED Video | RED Video |
| 4 | Not Used | GREEN Video | GREEN Video |
| 5 | Not Used | BLUE Video | BLUE Video |
| 6 | Intensity | Intensity | GREEN Intensity[1] |
| 7 | MONO Video | Video Reserved | BLUE Intensity[2] |
| 8 | Horiz. Drive | Horiz. Drive | Horiz. Sync. |
| 9 | Vert. Drive | Vert. Drive | Vert. Sync. |

EGA Notes:
[1]) Monochrome Intensity
[2]) Monochrome Video

If the printer data obtained from the serial port is memory mapped and in graphics format, it then becomes similar to ordinary computer video data in content and a substantially larger video memory becomes necessary depending upon the dot resolution of the usual printer data and the number of colors to be handled. This requires little elaboration since memory and video data processing needs for this sort of memory mapped printer application are obvious to a suitably skilled engineer or other practicing artisan.

Figure 13:
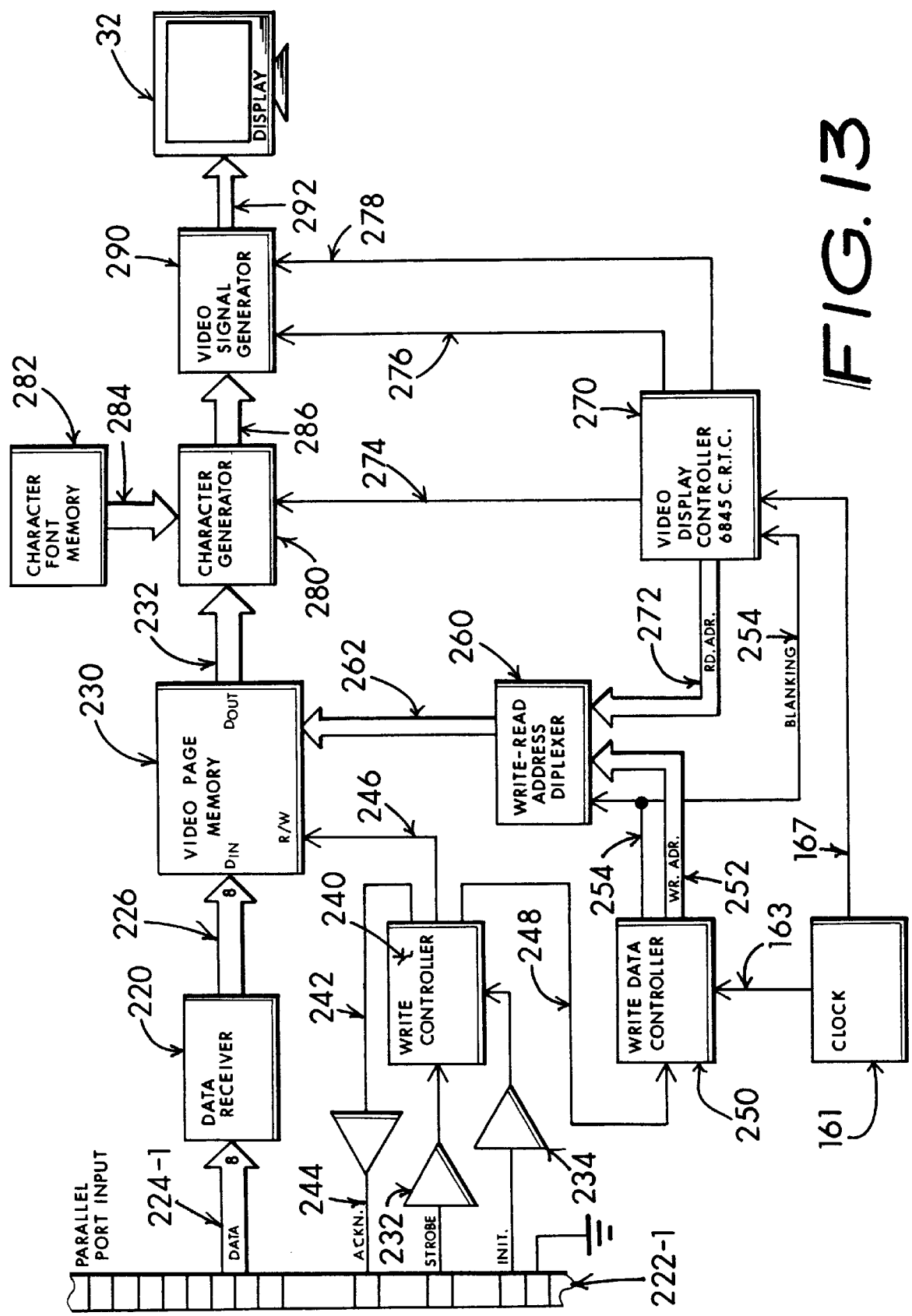
FIG. 13—Deriving TVA signals from usual computer parallel printer port with software operating in ASCII character mode or graphics mode.

A computer's parallel printer port is accessed 222-1 in FIG. 13 to deliver an 8-bit parallel data signal on line 224-1 to a data receiver 220 and therefrom via line 226 to a data input of a video page RAM 230. The parallel port also provides interflow of three other important signals:

A negative going STROBE signal coupled through a receiver 232 serves to signal the TVA that the data line states are valid and stable and therefore writeable into memory. In effect the strobe signal conditionally determines the write signal on line 246.

A negative going pulse on the ACKN (acknowledge) line 244 is delivered from the write controller 240 on line 242 to indicate that the previous data byte has been received and written into memory and now the next data byte may be sent. In effect the ACKN pulse is a feedback which in part determines the rate of data transfer between the computer and the TVA.

A negative pulse on the INIT (initialize) line delivers a signal through a buffer 234 to the write controller that essentially flags that a new screen (or page) of data is following the pulse.

The write data controller 250 also accepts a signal on line 248 from the write controller 240. The write data controller is responsible for developing the write address location for the video page memory, delivering a write address signal on line 252 as an input to a WRITE/READ address diplexer 260. The write data controller also delivers a signal on line 254 that serves to switch the diplexer between the write and the read address inputs. When in the write mode, the write address data is transferred to line 262 where it serves to various address memory locations in the video page memory 230. Alternatively, when no valid write data is present, the diplexer 260 switches to the read mode. A video display controller 270, which might utilize an industry type 6845 CRTC (cathode ray tube controller) or video controller integrated circuit, develops the read address data on line 272. A timing signal on line 274 serves to align the timing of a character generator 280 and horizontal and vertical scanning synchronization signals appear on lines 276,278 that couple with the video signal generator 290. Read data 232 from the memory 230 couples with the character generator 280 which, in combination with a character font memory 282 intercoupled therewith serves to deliver character data on line 286 that feeds into the video signal generator 290. The combined video data suitable for monitor application appears on line 292, therefrom supplying the secondary display monitor 32 with screen data. The video signal generator can serve to determine the format of the output video signal, thereby the secondary display monitor may be of any type compatible with the video signal. CGA, EGA, VGA, MDA and SVGA are a few of the types of video signal formats which this video signal generator can be engineered to accommodate.

Figure 14:
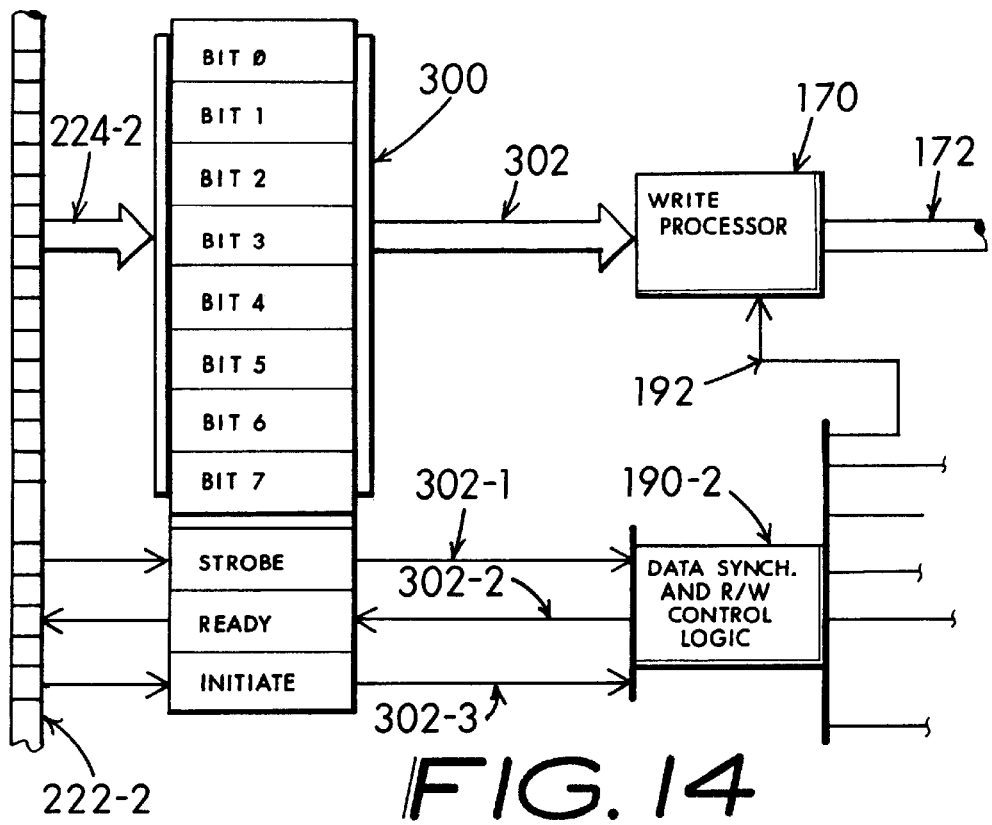
FIG. 14—Control signal paths for parallel printer port derived TVA data.

The parallel port connection 222-2 of FIG. 14 which is comparable to connection 222-1 of the earlier figure shows coupling of an 8-bit data bus 242-2 to the input of a data receiver 300, including 8 separate 1-bit receivers.

| IBM-PC PARALLEL PORT CONNECTOR ASSIGNMENTS 25-pin Female D-shell | |
|---|---|
| Pin | Function |
| 1 | Strobe |
| 2 | Data Bit 0 |
| 3 | Data Bit 1 |
| 4 | Data Bit 2 |
| 5 | Data Bit 3 |
| 6 | Data Bit 4 |
| 7 | Data Bit 5 |
| 8 | Data Bit 6 |
| 9 | Data Bit 7 |
| 10 | Acknowledge |
| 11 | Busy |
| 12 | Out of Paper |
| 13 | Select |
| 14 | Auto Feed |
| 15 | Error |
| 16 | Initialize |
| 17 | Select Input |

-continued

| IBM-PC PARALLEL PORT CONNECTOR ASSIGNMENTS 25-pin Female D-shell | |
|---|---|
| Pin | Function |
| 18 | Ground |
| 19 | Ground |
| 20 | Ground |
| 21 | Ground |
| 22 | Ground |
| 23 | Ground |
| 24 | Ground |
| 25 | Ground |

The received data appears on line 302 and couples with the write processor 170 as earlier said for FIG. 12. Necessary parallel port STROBE and INIT input signals and ACKN output signal data is also coupled between the connection 222-2 and the data synchronization and R/W control logic 190-2 via respective lines 302-1,302-3 and 302-2. Operation of the control logic 190-2 is similar to that taught for FIG. 12. It is a principal intent of my FIG. 14 teaching to show parallel port interface connection with the circuit of FIG. 12, which therein was taught having a serial port input.

Figure 15:
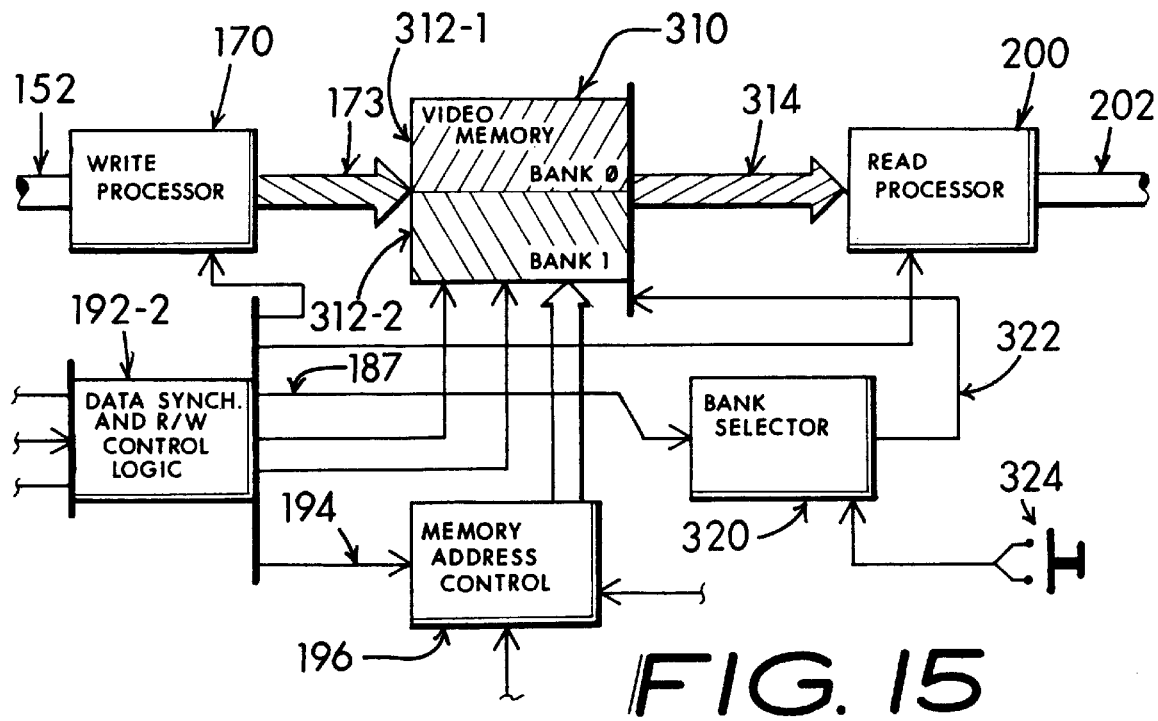
FIG. 15—Alternate bank switching of video memory to provide separate and alternate write and read time intervals.

A multibank video memory 310 appears in FIG. 15 which complements the earlier circuit of FIG. 12. The intent of this additional memory capacity, shown to include BANK-0 312-1 and BANK-1 312-2 is to enable the writing of new data to one memory bank concurrent with the other memory bank being read out. Since data transfer between the computer and the TVA of FIG. 12 is rather slow (due to a RS232C port's well known limitations on baud rates, etc.) this technique serves to largely overcome the typical slow writing of a screenful of information on the secondary display monitor. Instead instantaneous display of the filled memory bank occurs and less annoying performance ensues. In operation, a bank selector 320 obtains a synchronization signal from the control logic on line 187 and delivers a signal on line 322 which selects between BANK-0 and BANK-1 of the memory 310. More importantly I discover it beneficial that the onset of read-out of a memory bank being written into is delayed until data write-in is complete. As a result the data on line 314 coupled with the read processor 200 corresponds with the selected bank.

| WRITE BANK | READ BANK |
|---|---|
| BANK-0 | BANK-1 |
| BANK-1 | BANK-0 |

A manually operable switch 324 may also be utilized to initiate changeover selection of the memory banks.

Figure 16:
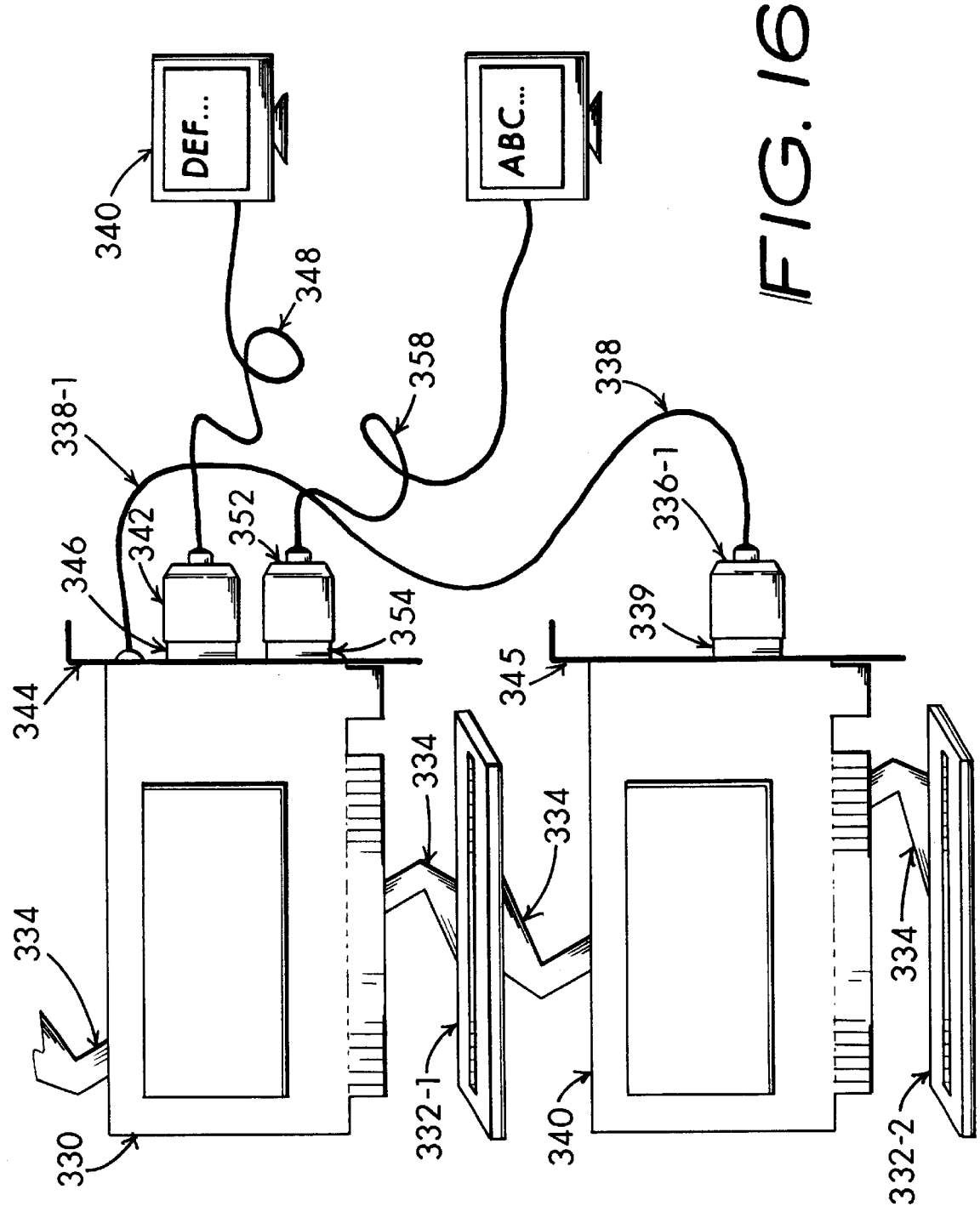
FIG. 16—TVA included on PC expansion card and including a jumper connection to mate with output of a video adapter card.

One embodiment of my TVA is preferably implemented as a plug-in printed circuit card 330 as depicted in FIG. 16 which may readily plug into an edge connector 332-1 ordinarily included in the computers I/O expansion bus or data bus extension 334. It is well known practice to use the expansion bus 334 for purpose of adding accessory cards and this is no exception. However, I merely utilize the expansion bus connections to obtain DC power and limited data bus access, primarily for video frame selection when using the TSR software. DC power is provided for operation of the TVA circuitry through connection with the following standard IBM-PC bus connections:

| EXPANSION CONNECTION | |
|---|---|
| BUS PIN No. | DELIVERS |
| B1, B10, B31 | GROUND |
| B3, B29 | +5 Volts DC |
| B5 | −5 Volts DC |
| B7 | −12 Volts DC |
| B9 | +12 Volts DC |

I provide a unique embodiment for the TVA card in that a connector 336 including a short cable 338 (typically about 25 cm length) captive with and extensive from the TVA circuit card structure 330 mates with a VIDEO OUTput connector 339 ordinarily located on a video adapter card 340 commonly included in the computer. As a result, two DB-15 connectors may be mounted upon the support bracket while the necessary third connector (actually the input to the TVA) is held by the umbilical cord arrangement created by the short cable 338. The video adapter card 340 itself plugs into an edge connector 332-2 portion of the expansion bus 334. A primary monitor 340 includes a cable and connector 342 which plugs into a mating connector 346 on the TVA support bracket 344. This allows coupling of the primary display video data with the primary monitor 340. A secondary monitor 350 also includes a cable and a connector 352 which mates with a connector 354 on the support bracket 344 and thereby secondary video data (e.g., antecedent video data) flows forth to the secondary monitor.

Figure 17:
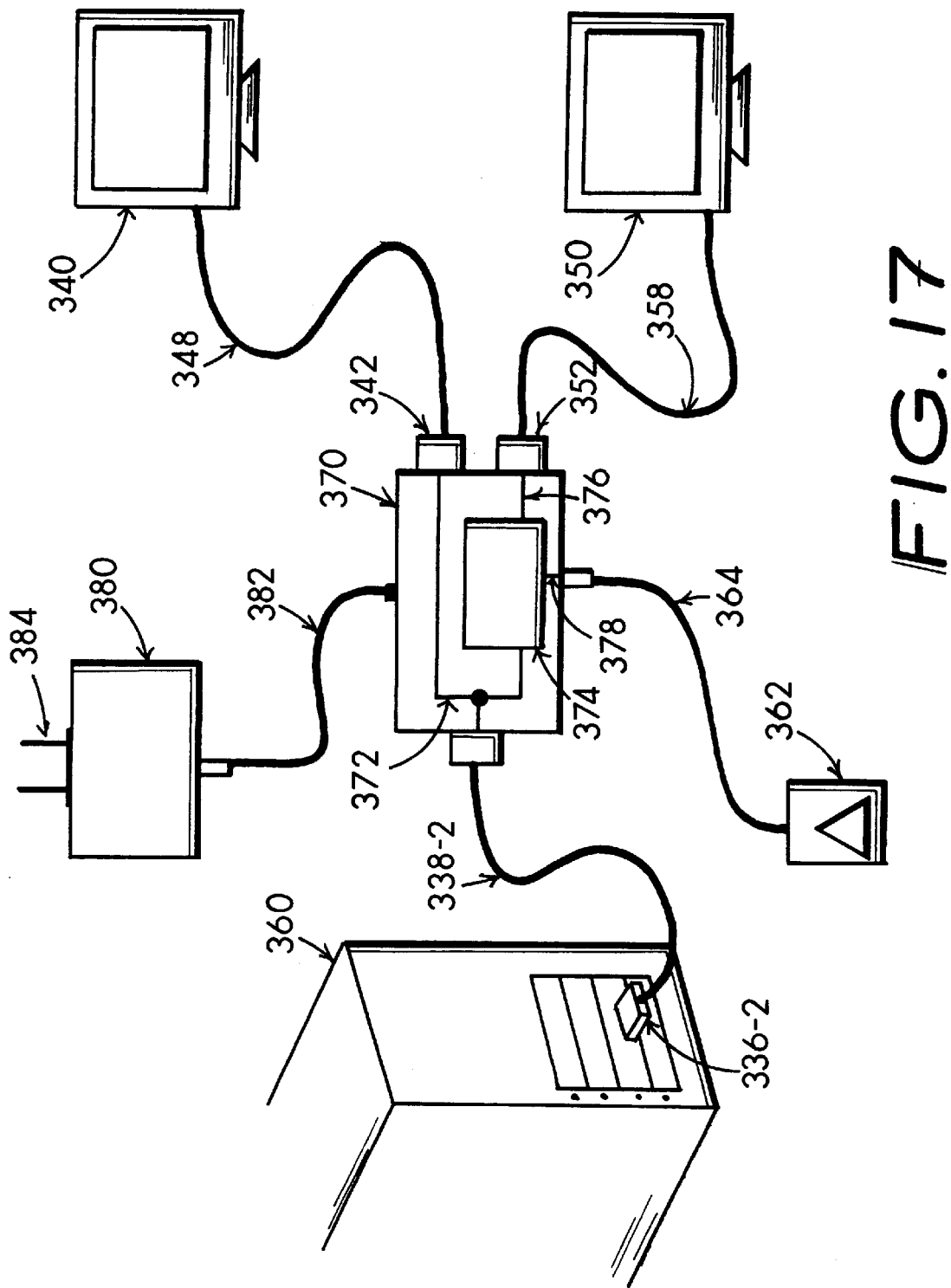
FIG. 17—TVA provided as a separate freestanding device providing universal installation for any of a variety of computer configurations.

Another preferred embodiment for my invention is generally depicted in FIG. 17 wherein the TVA is treated as a separate freestanding device 370. A computer 360 provides the processed video data signal from an internal video adapter/video graphics accelerator circuit usually configured as a plug-in card having a video signal port connection. The port connection is coupled via a connector 336-2 and cable 338-2 with an input into the TVA 370. Ordinarily the processed video data signal couples directly through the TVA via a signal line 372. The primary monitor 340 includes a connector that couples with the signal line 372 and includes a cable 348 for immediately routing the processed video data signal to the monitor 340 for display DEF.

The signal line 372 also couples with an input to the signal processing portion 374 of the TVA. The configuration of this portion 374 of the TVA is comparable to the circuit elements previously taught relative with FIG. 11. A keybutton actuated switch 362 or the like coupled with the TVA via cable 364 might be used to "grab" a selected frame of video display data, as discussed relative with element 66 of FIG. 11 and elsewhere. A delayed reiterative video signal (aka, a predecessory processed video data signal) presently appears on line 376, as reconstituted from data stored in a memory bank associated with the TVA processor 374 (see element 80 of FIG. 11 for example). The resulting output on line 376 couples with the secondary monitor 350 via connection 352 and cable 358 to produce a predecessory display ABC on the secondary monitor 350 for user comparative review or reference in conjunction with the current display DEF on the primary monitor 340. Additionally, I show a power supply such as a "plug in adapter" 380 providing d.c. operating voltage and current via line 382. This suggests that the TVA may be substantially independent from and merely an accessory to the computer 360. As a result, the computer 360 is essentially "left-alone", with no requirement for addition of plug-in circuit cards. Realize further that, when the keybutton switch 362 is utilized directly in conjunction with the TVA 370, the computer 360 may be operated fully innocent of any additional software needs relative with the TVA.

Although I teach several distinct forms for my invention (as depicted in the accompanying figures and description) this shall not be construed as limiting the scope of my invention to these particular combinations of elements or structural configurations. It is the utter essence of my invention to teach a computer display system in which a secondary monitor may deliver supplementary full screen displays of portions of a document or other data which is being edited or processed on a primary monitor and to give example of apparatus suitable for attaining practical embodiment of the system's method having economical utility for consumer and business oriented applications. It is necessary to realize that the secondary display operating apparatus might take other forms which can be differently engineered to suit a particular application or meet specific operational goals without departing from the fundamental spirit of my invention. It is furthermore necessary to realize that when I give specific operating conditions and signal line hookups for representative operation of portions of the hardware associated with my apparatus or when I recite particular functional conditions or data format, these definitions are guidelines which may serve to example the art which I have developed to others but should not be construed as limiting or regulatory regarding the operative essence of my invention. For example, my reference to a keystroke sequence of Alt_Shft_PScr is not to be construed as limiting, but merely illustrative for purposes of this description. Undoubtedly an enormous variety of keystroke combinations and key entry sequences may be concocted which will work with similar efficacity. A skilled artisan will readily understand that my invention is not narrowly limited to the particular kinds of data sources or display types which I discuss, but the produced operational improvements and user convenience afforded by my invention may be more broadly extended to benefit virtually any type of computer display configuration requiring supplementary displays of previous screens of data on a secondary monitor. Although I show my taught embodiments to be based upon contemporary IBM-PC technology (including clone computers built by Gateway, Dell, Compaq, Hewlett-Packard, etc.), adaptation of my invention's essence to networked workstations and other less popular or older personal computer configurations (including Apple, Macintosh, Acorn, Tandy and others) is considered a mere engineering effort meeting the special or proprietary hardware details of these less popular or obsolete systems. I anticipate that other even substantial variations of my invention's specific form may be implemented which can still serve to satisfy the operational aspects of the functional elements of my invention and such variant choices shall be considered as mere engineering expedients and fully within the scope of my appended claims.

What I claim for my invention is:

1. A multiple monitor video display method for use with a computer to produce a real-time display on a first monitor and a computer user selected predecessory display on a second monitor and comprising steps of:

processing computer program data into a ported source of display-ready first processed video data signal;

first intercoupling the ported source of first processed video data signal and the first monitor;

first displaying the first processed video data signal on the first monitor as the real time display;

second intercoupling the ported source of first processed video data signal and a translative video adapter (TVA) comprising further steps of:

first enabling the computer user to select a first sample of a first screen portion of the first processed video data signal second intercoupled with a TVA input port;

first storing first video data representing the first sample in a first memory;

advancing the computer program data to usually produce a second screen portion of the first processed video data signal for updating the real-time display on the first monitor;

first reading the first stored said first video data from the first memory;

first converting the first read said first video data signal into a first predecessory video signal; and, second displaying the first predecessory video signal on a second monitor as the first predecessory display.

2. The multiple monitor video display method of claim 1 comprising steps of:

the first enabling the user to select and divert a second sample of a second screen portion of the first processed video data signal intercoupled with the TVA input port;

second storing second video data representing the second sample in a second memory;

advancing the computer program data to usually produce a third screen portion of the first processed video data signal for third display on the first monitor as the updated real time display;

second reading the second stored said second video data;

third converting the second read said second video data into a second predecessory video signal; and, third displaying the second predecessory video signal on a tertiary monitor as a second order predecessory display.

3. The multiple monitor video display method of claim 2 comprising steps of:

partitioning the first memory into at least two memory bank portions;

said first storing the storable first video data in a first memory bank portion of the first memory;

said second storing the storable second video data in a second memory bank portion of the first memory;

said first reading the first stored said first video data from the first memory bank portion of the first memory; and, said second reading the second stored said second video data from the second memory bank portion of the first memory.

4. The multiple monitor video display method of claim 3 comprising steps of:

the first enabling the user to select and divert a third sample of a screen portion of the first processed video data signal intercoupled with the TVA input port;

third storing third video data representing the third sample in a third memory bank portion of the first memory; and, whereby:

concurrent with a first writing of the first video data into the first memory bank, the second memory bank may be said subsequently read and produce display data for the tertiary monitor and the third memory bank may be subsequently read and produce the display data for the secondary monitor;

concurrent with a second writing of the second video data into the second memory bank, the first memory bank may be said subsequently read and produce the display data for the secondary monitor and the third memory bank may continue to be read and produce the display data for the tertiary monitor; and, concurrent with a third writing of the third video data into the third memory bank, the first memory bank may be said subsequently read and produce the display data for the tertiary monitor and the second memory bank may be subsequently read and produce the display data for the secondary monitor.

5. The multiple monitor video display method of claim 3 comprising steps of:

the first enabling the user to select and divert a third sample of a third screen portion of the first processed video data signal intercoupled with the TVA input port;

third storing the third video data representing the third sample in a third memory bank portion of the first memory; and, second enabling the user to select between reading video data stored in the second memory bank and the third memory bank and produce the predecessory video signal for immediate coupling with and rendering on the secondary monitor.

6. The multiple monitor video display method of claim 1 comprising steps of:

interfacing the user with the computer program;

modifying content of the first processed video data signal and the real time display through computer data entries submitted by the user;

maintaining the first predecessory video signal unchanged; and, presenting the unchanged first predecessory video signal on the secondary monitor as the predecessory display;

whereby the first monitor may be referred to by the user for a primary viewing of the realtime display and the second monitor may be referred to by the user for a secondary viewing of the predecessory display.

7. The antecedent video display method of claim 1 comprising steps of:

installing a keystroke sequence respondent software program in the computer; and, recognizing a first pattern of unique keystroke sequence entries and therefrom producing a first selection signal to effectuate the selection of at least one of the first sample and the second sample of the first processed video data signal presented to the input port.

8. The multiple monitor video display method of claim 1 comprising steps of:

first entering a pragmatical PRINT_SCREEN command in response to the user's said selection;

accessing the TVA input port through the computer's printer data signal output port usually configured as one of a RS232C serial port COM, a USB port and a parallel port LPT; and, first reformatting a printer data signal urged by the first entry and delivered through the printer data signal output port into the first predecessory video signal.

9. A multiple screen computer display method for concurrent viewing by a computer operator and including a first monitor displaying current video data and a second monitor presenting a supplementary display of video data, comprising steps of:

operating a computer under software control to produce a first screen data signal comprising a processed video data signal delivered as a display-ready video signal via a video output port;

intercoupling the display-ready video signal between the video output port, a translative video adapter (TVA) and the first monitor;

first displaying the first screen data signal as a current video signal on the first monitor;

selecting a first sample of the first screen data signal;

first storing data representing the first sample of the first screen data signal in a first memory;

urging the computer to produce a second screen data signal;

second displaying the second screen data signal as the current video signal on the first monitor;

first reading the first stored data from the first memory; and, first converting the first read said first stored data into a supplementary display video signal; and, first rendering the supplementary display video signal on the second monitor.

10. The multiple screen computer display method of claim 9 comprising steps of:

selecting a second sample of the second screen data signal;

second storing the second sample of the second screen data signal in the first memory;

said urging the computer to produce a third screen data signal;

presently displaying the third screen data as the current video data signal rendering on the first monitor;

second reading the second stored data from the first memory;

second converting the second read said second stored data into the supplementary display video signal; and, second rendering the supplementary display video signal on the second monitor.

11. The multiple screen computer display method of claim 10 comprising steps of:

partitioning the first memory into at least a first memory bank and a second memory bank;

first writing the first screen data into the first memory bank portion of the first memory;

second writing the second screen data into the second memory bank portion of the first memory; and, choosing between at least the first screen data stored in the first memory bank and the second screen data stored in the second memory bank for coupling with and presenting the second rendering on the secondary monitor.

12. The multiple screen computer display method of claim 9 comprising steps of:

loading a unique keystroke sequence responsive TSR software program into the computer; and, said selecting the first sample of the first screen data signal in immediate response to a recognition of an entry of the unique keystroke sequence denoting a selection command submitted by the computer operator.

13. A multiple screen computer display apparatus, comprising:

a computer means including a first processed video data signal output port;

a primary monitor means coupled with the first processed video data signal output port and producing an immediate display of the processed video data signal;

a translative video adapter (TVA) means functionally distinct from data processing and video signal processing activities of the computer means and coupled with the first processed video signal path ordinarily coupled between the primary monitor means and the computer means, including:

first operative means enabling a user to first select and capture a first page sample from the first processed video data signal path;

first conversional means for adapting the first page sample of the first processed video data signal into a first storable video data signal;

first memory means configured for storing the first storable video data signal;

first retrieval means for iteratively fetching the stored said first storable video data signal;

second conversional means set for reconstituting the fetched said first storable video data signal into a second processed video data signal; and, secondary monitor means coupled with the second conversional means for producing a first predecessory video data display of the iteratively read said second processed video data signal.

14. Multiple screen computer display apparatus of claim 13, further comprising:

said first operative means further enabling a user to second select and capture a second page sample from the processed video data signal path;

said first conversional means for adapting the second page sample of the first processed video data signal into a second storable video data signal;

second memory means configured for storing the second storable video data signal;

second retrieval means for iteratively fetching the second stored said second storable video data signal;

third conversional means set for reconstituting the fetched said second storable Video data signal into a third processed video data signal; and, tertiary monitor means coupled with the third conversional means for producing a second predecessory video data display of the iteratively read said third processed video data signal.

15. Multiple screen computer display apparatus of claim 13, further comprising:

the first operative means of claim 13 comprising a TSR (transient stay resident) software program providing keystroke sequence recognition of a manual keyboard entry to thereby enable the user to said first select and capture the first page sample from the first processed video data signal path.

16. Multiple screen computer display apparatus of claim 13, further comprising:

ancillary selection means including a momentary switch means which may be actuated by the user;

signal conduit means effective for coupling a selection signal produced by the momentary switch means with a selection signal input port coupling with the TVA; and, selection logic means coupled between the selection signal input port and the first operative means enabling a user to first select and capture a first page sample from the processed video data signal path.

17. The translative video adapter means of claim 13 comprising:

a plug-in printed circuit means configured to physically and electrically interface with an expansion slot means portion of the computer means, including:

a first video connective means for coupling the video signal data between the computer means said first processed video data signal output port and the plug-in printed circuit means;

a second video connective means for coupling the first processed video data signal between the first video connective means and the primary monitor means; and, a third video connective means for coupling at least the second processed video data signal with the secondary monitor means.

18. The translative video adapter means of claim 13 further comprising:

A/D (analog to digital) converter means having an analog input coupled with at least the first page sample of the first processed video data signal and having a digital output port coupled with a write-data input port of the first memory means;

D/A (digital to analog) converter means having a digital input coupled with a read-data output port of the first memory means and having an analog output port coupled with a driver means and therefrom delivering the reconstituted said second processed video data signal that usually couples with the secondary monitor means; and, memory control logic means coupled with the A/D converter, the D/A converter and the first memory means to determine synchronization of the first memory means write-data, read-data and address control signal lines.

19. The multiple screen computer display apparatus of claim 13, further comprising:

a data receiver means coupled with a serial port comprising the computer means;

write processor means for conversion of ASCII and binary serial data received through the serial port into a storable binary format data signal coupled with a write-data input of a third memory means;

data synchronization logic means for receiving control line signals from the serial port and determining a pattern of synchronization control signals for writing into and reading from the third memory means;

character generator means coupled with the third memory means read-data output port and produce video character signals in response to stored binary format data which are read from the third memory means;

clock means establishing timing and general synchronization of at least the data receiver means, third memory means addressing and a video processor means; and, said video processor means includes a second processed video output which may couple with and render a predecessory display on the secondary monitor means.

20. The multiple screen computer display apparatus of claim 13, further comprising:

a data receiver means coupled with a parallel (printer) port comprising the computer means;

the first memory means including the write-data input port coupled with the data receiver means parallel data output port and a read-data output port which may access data stored in predetermined addressable locations within the memory means;

character generator means including an input coupled with the first memory means said read-data output port;

character font memory means coupled with the character generator means;

write and read control logic means including an input coupled with the parallel (printer) port and an output coupled with the video page memory means; and, video display generator providing a data transfer synchronization between at least the character generator means, read-out of the first memory means and video display scanning rates for the secondary monitor means, including an input coupled with an output signal port of the character generator and an output producing the second processed video data signal for rendering a predecessory display on the secondary monitor means.

* * * * *